(12) United States Patent
Ofuji et al.

(10) Patent No.: US 10,914,849 B2
(45) Date of Patent: Feb. 9, 2021

(54) RADIATION IMAGING APPARATUS

(71) Applicant: CANON KABUSHIKI KAISHA, Tokyo (JP)

(72) Inventors: Masato Ofuji, Takasaki (JP); Minoru Watanabe, Yokohama (JP); Kentaro Fujiyoshi, Tokyo (JP); Sho Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/180,756

(22) Filed: Nov. 5, 2018

(65) Prior Publication Data
US 2019/0146103 A1    May 16, 2019

(30) Foreign Application Priority Data

Nov. 10, 2017  (JP) ................................ 2017-217512

(51) Int. Cl.
| | | |
|---|---|---|
| *G01T 1/20* | (2006.01) | |
| *G01T 1/24* | (2006.01) | |
| *H04N 5/367* | (2011.01) | |
| *H04N 5/32* | (2006.01) | |

(52) U.S. Cl.
CPC ............... *G01T 1/247* (2013.01); *H04N 5/32* (2013.01); *H04N 5/367* (2013.01)

(58) Field of Classification Search
CPC ........... G01T 1/247; H04N 5/32; H04N 5/367
USPC .................................................. 250/370.08
See application file for complete search history.

(56) References Cited

U.S. PATENT DOCUMENTS

| | | |
|---|---|---|
| 7,205,568 B2 | 4/2007 | Watanabe et al. |
| 7,381,965 B2 | 6/2008 | Ishii et al. |
| 7,541,617 B2 | 6/2009 | Mochizuki et al. |
| 7,629,564 B2 | 12/2009 | Mochizuki et al. |
| 7,642,517 B2 | 1/2010 | Ishii et al. |
| 7,645,976 B2 | 1/2010 | Watanabe et al. |
| 7,812,313 B2 | 10/2010 | Mochizuki et al. |
| 7,812,317 B2 | 10/2010 | Watanabe et al. |
| 7,858,947 B2 | 12/2010 | Mochizuki et al. |
| 7,923,695 B2 | 4/2011 | Ishii et al. |
| 7,932,946 B2 | 4/2011 | Ishii et al. |
| 8,067,743 B2 | 11/2011 | Ishii et al. |
| 8,084,745 B2 | 12/2011 | Mochizuki et al. |

(Continued)

FOREIGN PATENT DOCUMENTS

JP    2012-191599    4/2012

*Primary Examiner* — David P Porta
*Assistant Examiner* — Gisselle M Gutierrez
(74) *Attorney, Agent, or Firm* — Venable LLP

(57) ABSTRACT

A radiation imaging apparatus includes a pixel portion in which a plurality of pixels, each pixel including a conversion element configured to convert radiation into charge, are arranged in a matrix, a driving circuit configured to drive a plurality of driving lines and a processing unit configured to process a signal from the pixel portion. The driving circuit performs a reset operation in which the conversion elements of the plurality of pixels are repetitively reset. The pixel portion includes rows in which the pixels have been divided into a plurality of groups. The conversion elements of the plurality of groups are reset at different timings in the reset operation, and the processing unit corrects, by using a signal of a pixel of another group, a signal of a pixel of a group with data deficiency caused by the reset operation.

20 Claims, 19 Drawing Sheets

(56) References Cited

U.S. PATENT DOCUMENTS

| | | |
|---|---|---|
| 8,154,641 B2 | 4/2012 | Nomura et al. |
| 8,368,027 B2 | 2/2013 | Ishii et al. |
| 8,536,535 B2 | 9/2013 | Amitani et al. |
| 8,680,472 B2 | 3/2014 | Mochizuki et al. |
| 8,829,438 B2 | 9/2014 | Sato et al. |
| 8,878,972 B2 | 11/2014 | Wayama et al. |
| 9,048,154 B2 | 6/2015 | Takenaka et al. |
| 9,128,196 B2 | 9/2015 | Sato et al. |
| 9,134,432 B2 | 9/2015 | Iwashita et al. |
| 9,234,966 B2 | 1/2016 | Sugawara et al. |
| 9,270,903 B2 | 2/2016 | Wayama et al. |
| 9,277,896 B2 | 3/2016 | Ofuji et al. |
| 9,423,512 B2 | 8/2016 | Sato et al. |
| 9,423,513 B2 | 8/2016 | Watanabe et al. |
| 9,462,989 B2 | 10/2016 | Takenaka et al. |
| 9,468,414 B2 | 10/2016 | Ryu et al. |
| 9,470,800 B2 | 10/2016 | Iwashita et al. |
| 9,521,347 B2 | 12/2016 | Kawanabe et al. |
| 9,541,653 B2 | 1/2017 | Iwashita et al. |
| 9,625,585 B1 | 4/2017 | Yokoyama et al. |
| 9,661,240 B2 | 5/2017 | Fujiyoshi et al. |
| 9,675,307 B2 | 6/2017 | Ofuji et al. |
| 9,726,767 B2 | 8/2017 | Kawanabe et al. |
| 9,812,474 B2 | 11/2017 | Yagi et al. |
| 9,835,732 B2 | 12/2017 | Fujiyoshi et al. |
| 9,838,638 B2 | 12/2017 | Furumoto et al. |
| 9,948,871 B2 | 4/2018 | Wayama et al. |
| 9,977,135 B2 | 5/2018 | Yokoya et al. |
| 10,009,990 B2 | 6/2018 | Takenaka et al. |
| 10,068,943 B2 | 9/2018 | Fujiyoshi et al. |
| 2011/0317054 A1 | 12/2011 | Kameshima et al. |
| 2013/0342514 A1 | 12/2013 | Yokoyama et al. |
| 2014/0151769 A1 | 6/2014 | Wayama et al. |
| 2014/0154833 A1 | 6/2014 | Wayama et al. |
| 2014/0239186 A1 | 8/2014 | Sato et al. |
| 2014/0241506 A1* | 8/2014 | Iwashita .............. G01T 1/16 378/91 |
| 2014/0361189 A1* | 12/2014 | Kameshima ......... H04N 5/3765 250/393 |
| 2016/0270755 A1* | 9/2016 | Takenaka .............. G01T 1/20 |
| 2017/0303878 A1* | 10/2017 | Iwashita .............. A61B 6/4208 |
| 2018/0008215 A1 | 1/2018 | Wayama et al. |
| 2018/0055464 A1 | 3/2018 | Watanabe et al. |
| 2018/0136343 A1 | 5/2018 | Terui et al. |
| 2018/0239033 A1 | 8/2018 | Ishii et al. |
| 2018/0275255 A1* | 9/2018 | Yates ..................... G01S 17/89 |
| 2018/0317868 A1 | 11/2018 | Terui et al. |
| 2018/0321397 A1* | 11/2018 | Kawanabe .......... H04N 5/3696 |
| 2018/0328862 A1* | 11/2018 | Sato ..................... G01T 1/208 |

* cited by examiner

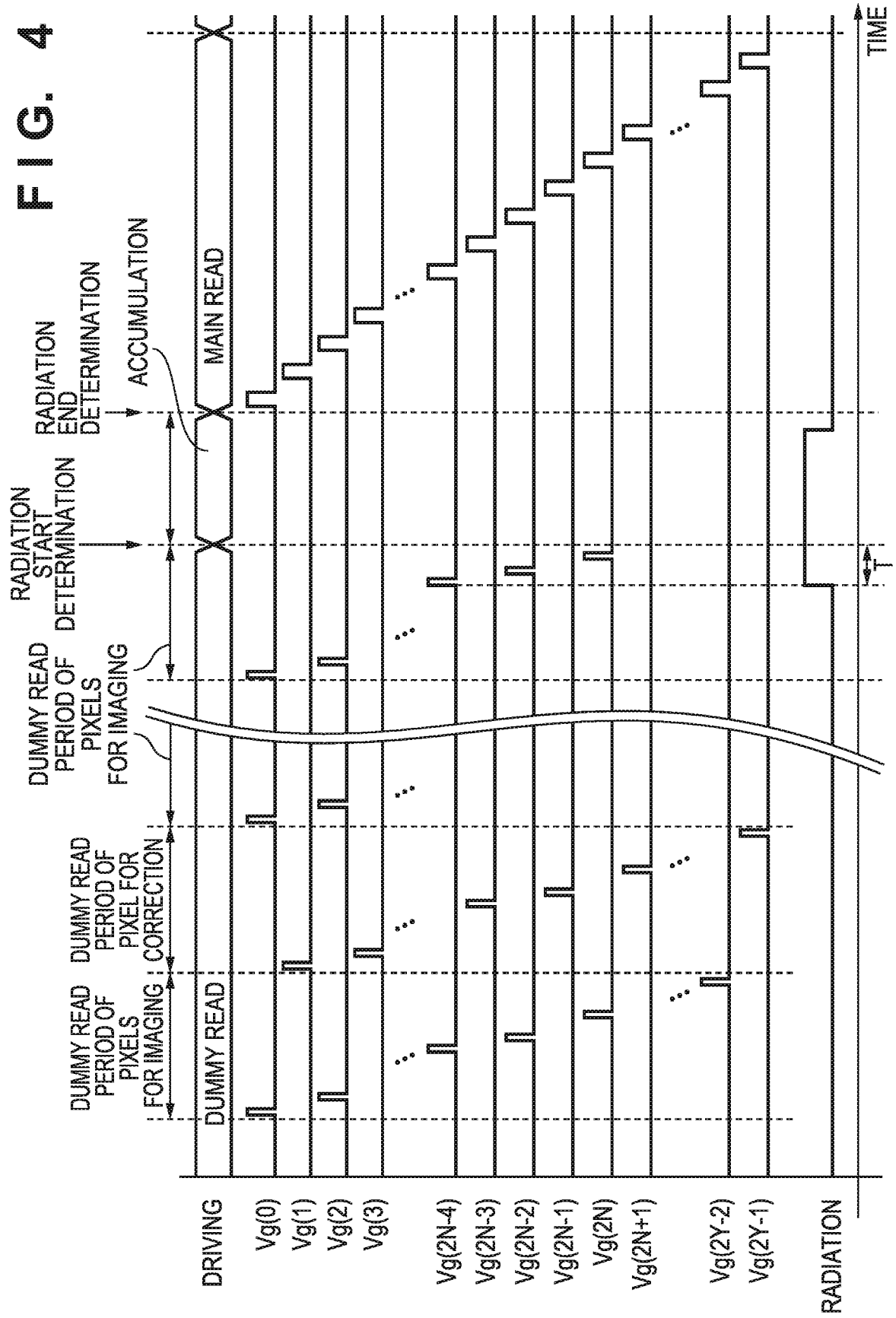

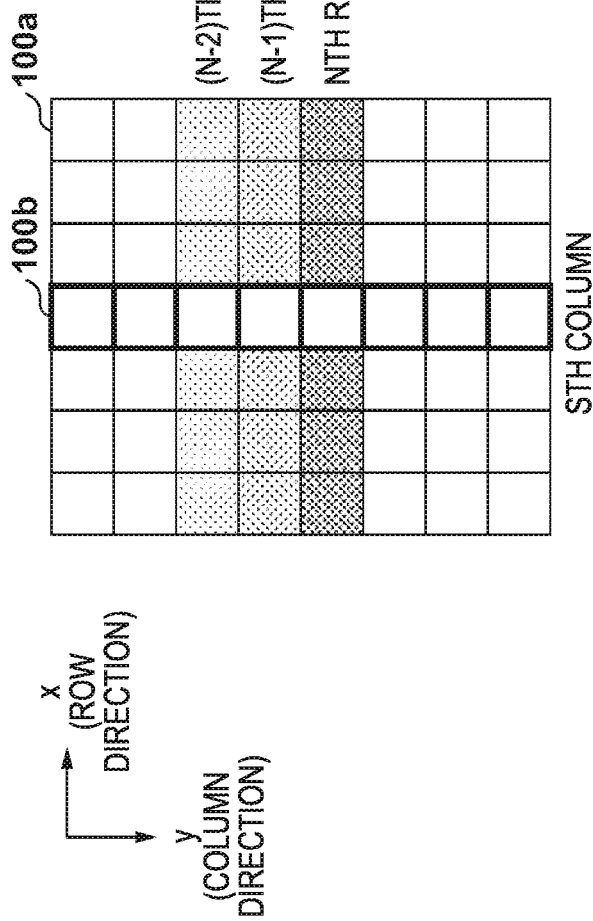
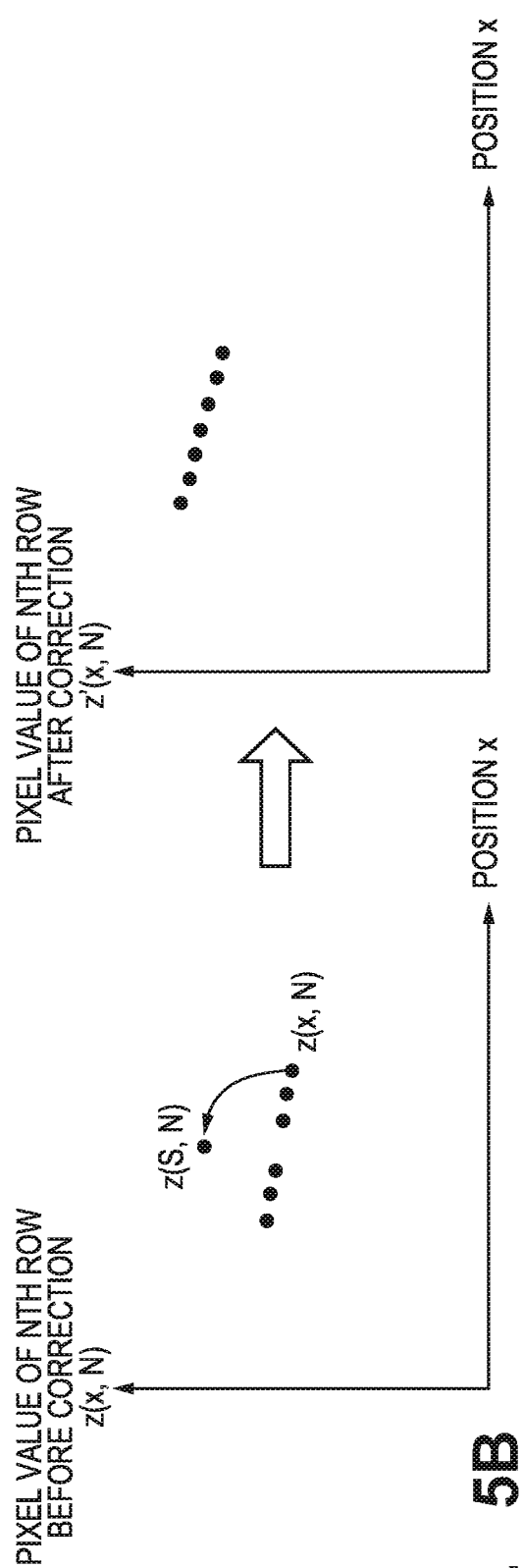
FIG. 5A
FIG. 5B

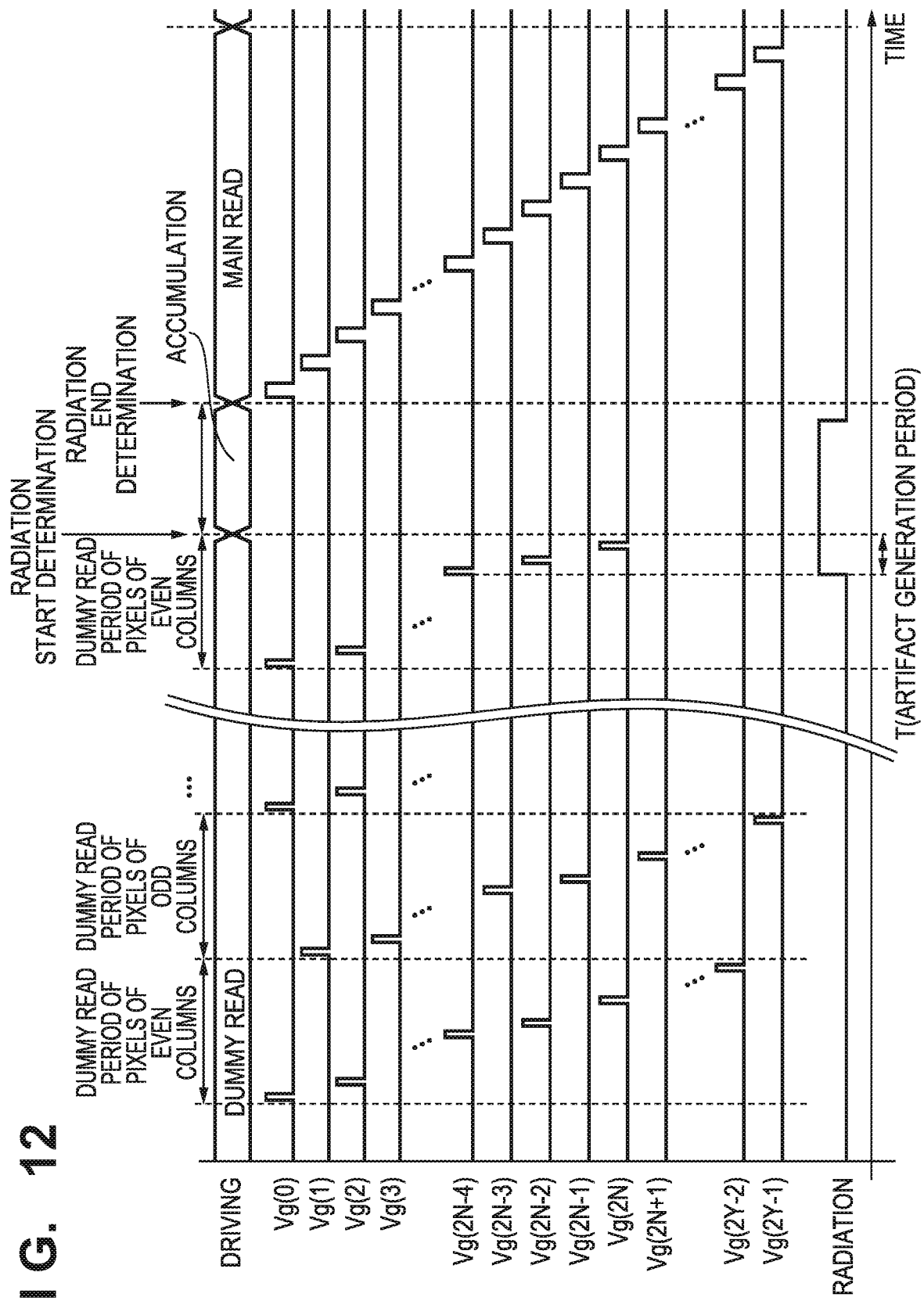

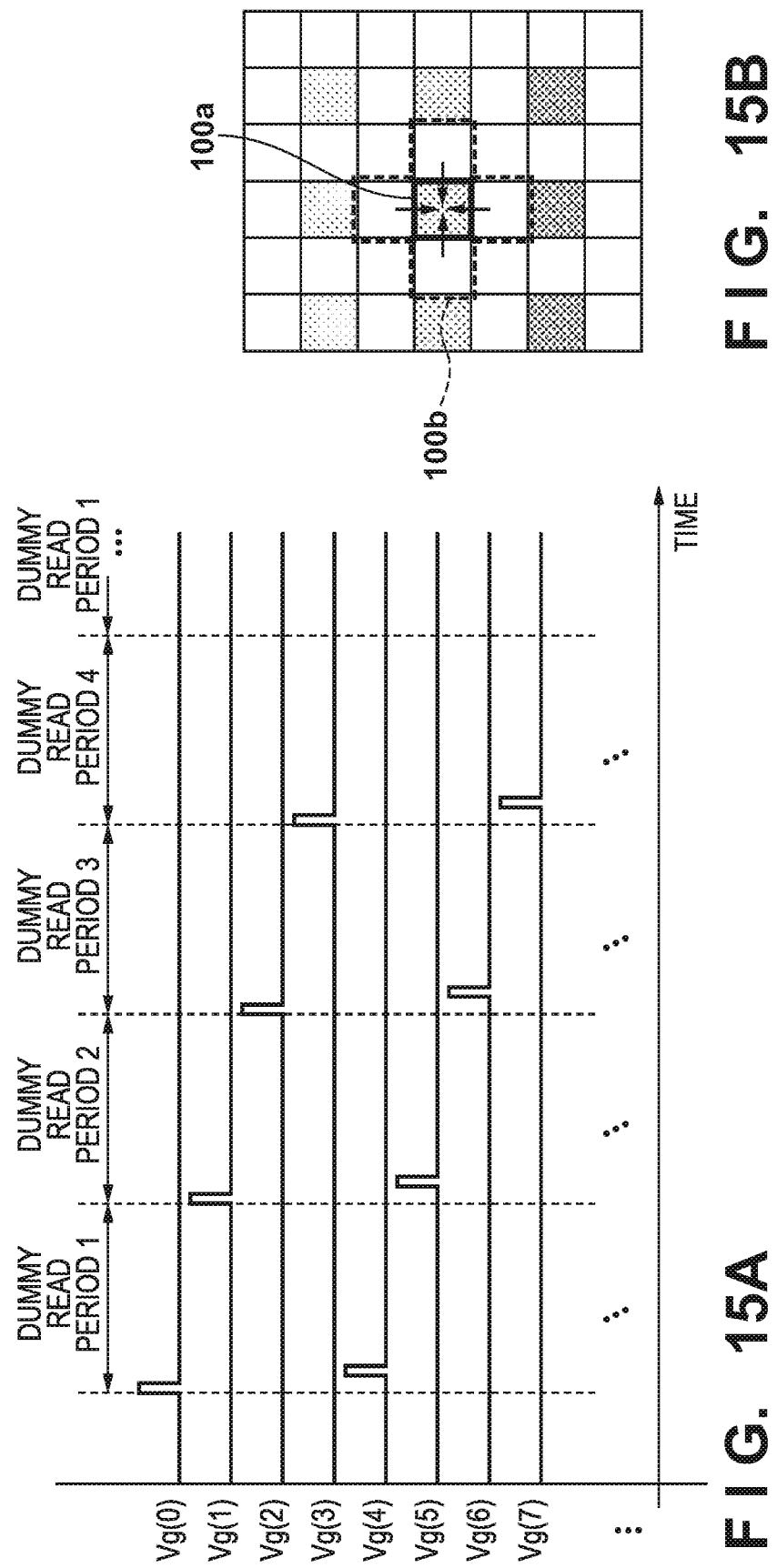

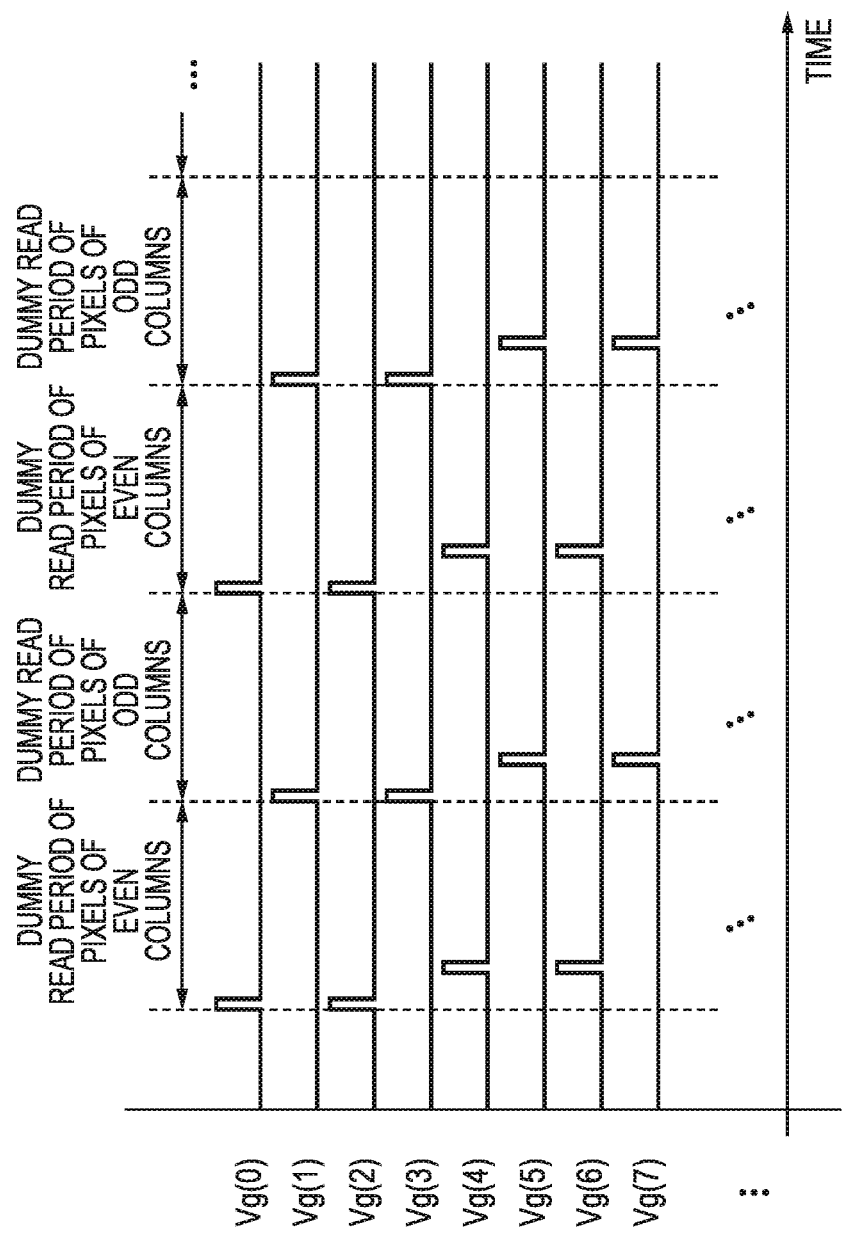
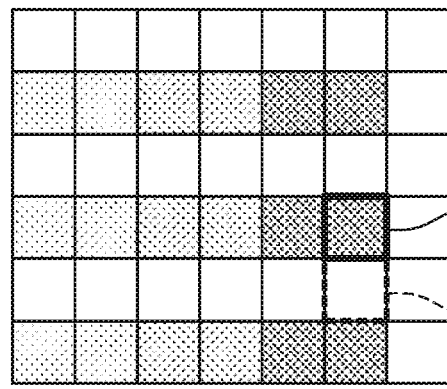
FIG. 16A
FIG. 16B

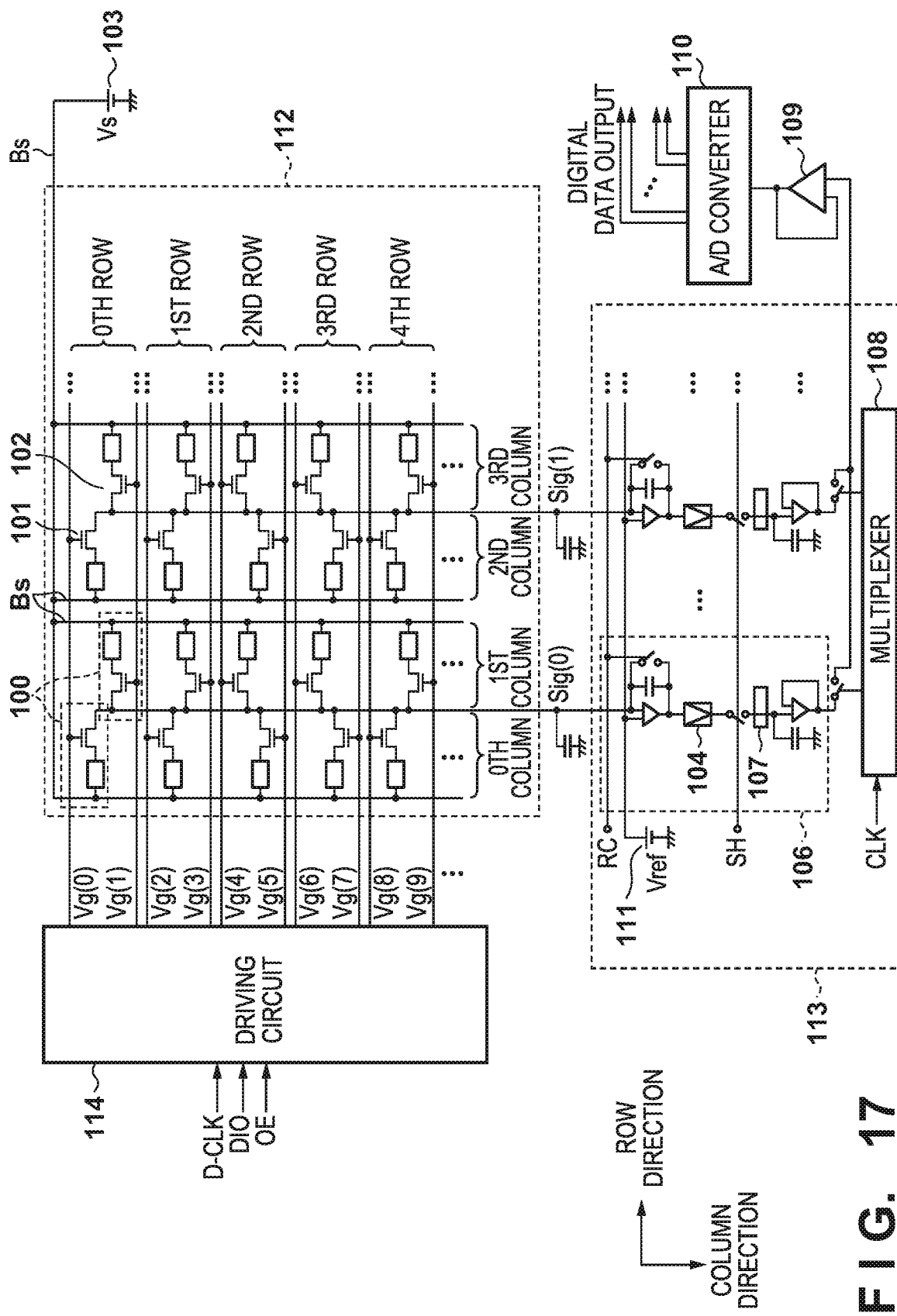
F I G. 17

RADIATION IMAGING APPARATUS

BACKGROUND OF THE INVENTION

Field of the Invention

The present invention relates to a radiation imaging apparatus that is used for still image capturing such as general imaging and moving image capturing such as fluoroscopy in medical diagnosis.

Description of the Related Art

As an imaging apparatus used for medical image diagnosis and non-destructive inspections using radiation, a radiation imaging apparatus that uses a flat panel detector (to be abbreviated as FPD hereinafter) is popular. When a radiation generation apparatus and a radiation imaging apparatus are physically connected to each other for synchronization, the installation location and the location of use of the radiation imaging apparatus are restricted. If the radiation imaging apparatus is arranged so that the apparatus itself can detect the start and the end of the radiation irradiation, the aforementioned connection will be unnecessary, and it will be possible to use the radiation imaging apparatus in various kinds of locations.

In an apparatus disclosed in Japanese Patent Laid-Open No. 2012-191599, a reset operation is performed to discharge charge accumulated in a sensor by periodically setting a switch element to a conductive state so that charge due to a dark current will not be accumulated in the sensor during a determination period until the start of radiation irradiation. In a case in which radiation irradiation is performed at the time of the reset operation, if it takes time for the radiation imaging apparatus to detect the start of radiation irradiation from when radiation irradiation is started, some of the effective charge generated in the pixels will leak to the signal line, and this can cause data deficiency. This generates a line defect in an image obtained by the radiation imaging apparatus. If the time until the detection is further prolonged, the line defect can further expand into a band shape.

In Japanese Patent Laid-Open No. 2012-191599, a pixel value of the radiation imaging apparatus is corrected (restored) by specifying the range in which a line defect has occurred by analyzing the profile of each pixel value in a column direction (signal direction) based on the average value of pixel values in a row direction (gate line direction). However, in the analysis stage of the profile in the column direction, there may be cases in which a line defect cannot be corrected appropriately if the line defect generated by a data deficiency and the actual change in the profile of the pixel value cannot be discriminated from each other. As a result, artifacts may be generated on the corrected image.

SUMMARY OF THE INVENTION

The present invention has been made in consideration of the above situation, and provides a technique advantageous in reducing artifacts included in an image captured by a radiation imaging apparatus.

According to an aspect of the present invention, the present invention provides a radiation imaging apparatus comprising a pixel portion in which a plurality of pixels, each pixel including a conversion element configured to convert radiation into charge and to accumulate the charge and a switch element that connects the conversion element to a signal line, are arranged in a matrix, a driving circuit configured to drive a plurality of driving lines; and a processing unit configured to process a signal from the pixel portion, wherein a control terminal of the switch element of each of the plurality of pixels is connected to any one of the plurality of driving lines, the driving circuit performs a reset operation in which the conversion elements of the plurality of pixels are repetitively reset until radiation irradiation is detected, stops the reset operation upon detecting the radiation irradiation, causes the conversion element to accumulate charge, and subsequently causes the conversion element to output a signal corresponding to an amount of the accumulated charge, the pixel portion includes rows in which the pixels have been divided into a plurality of groups, and the conversion elements of the plurality of groups are reset at different timings in the reset operation, and the processing unit corrects, by using a signal of a pixel of another group, a signal of a pixel of a group with data deficiency caused by the reset operation.

Further features of the present invention will become apparent from the following description of exemplary embodiments with reference to the attached drawings.

BRIEF DESCRIPTION OF THE DRAWINGS

FIG. 4 is a timing chart showing the control method of the radiation imaging apparatus;

FIGS. 5A and 5B are a view showing a two-dimensional image representing pixel values before correction and a view showing pixel values before and after correction, respectively;

FIG. 12 is a timing chart showing a control method of a radiation imaging apparatus;

FIGS. 15A and 15B are a timing chart showing driving timings of driving lines and a view showing a correction method, respectively;

FIGS. 16A and 16B are a timing chart showing the driving timings of the driving lines and a view showing a correction method, respectively;

FIG. 17 is a circuit diagram of the imaging apparatus;

DESCRIPTION OF THE EMBODIMENTS

Embodiments to which the present invention can be applied will be described hereinafter. Note that radiation according to the present invention can include not only α-rays, β-rays, and γ-rays that are beams generated by particles (including photons) emitted by radioactive decay but also beams having energy equal to or higher than the energy of these beams, for example, X-rays, particle beams, and cosmic rays.

First Embodiment

Figure 1:
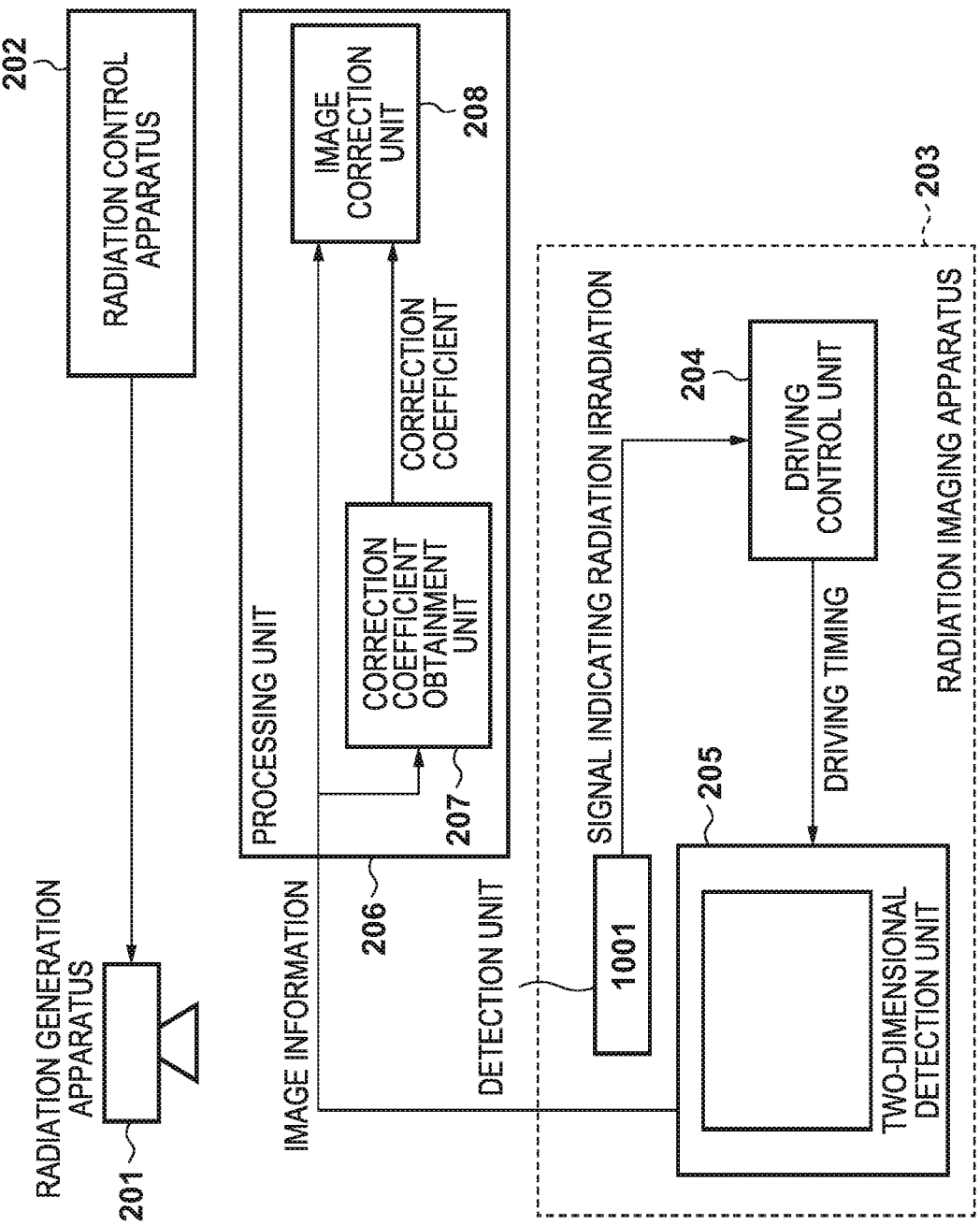
FIG. 1 is a block diagram of the arrangement of a radiation imaging system.

FIG. 1 is a block diagram showing an example of the arrangement of a radiation imaging system to which the present invention can be applied. The radiation imaging system includes a radiation generation apparatus 201, a radiation control apparatus 202, a processing unit 206, and a radiation imaging apparatus 203. The radiation imaging apparatus 203 includes a two-dimensional detection unit 205, a driving control unit 204, and a detection unit 1001. The processing unit 206 includes a correction coefficient obtainment unit 207 and an image correction unit 208.

The radiation control apparatus 202 controls radiation irradiation performed by the radiation generation apparatus 201. The radiation generation apparatus 201 irradiates (exposes) the radiation imaging apparatus 203 via an object with radiation under the control of the radiation control apparatus 202. The two-dimensional detection unit 205 is a sensor in which radiation detection elements are two-dimensionally arrayed in a matrix of Y rows and X columns, and the two-dimensional detection unit outputs, under the control of the driving control unit 204, image information corresponding to the detected radiation irradiation to the processing unit 206. The arrangement of the two-dimensional detection unit 205 will be described in detail later with reference to FIG. 2. The correction coefficient obtainment unit 207 calculates a correction coefficient based on the image information input from the two-dimensional detection unit 205 and outputs the obtained correction coefficient to the image correction unit 208. The image correction unit 208 uses the correction coefficient input from the correction coefficient obtainment unit 207 to correct the image information input from the two-dimensional detection unit 205. The detection unit 1001 detects the start and the end of the radiation irradiation operation, and outputs a signal indicating the radiation irradiation to the driving control unit 204. The driving control unit 204 controls the operation of the two-dimensional detection unit 205 by a driving method which has been requested beforehand from the processing unit 206, and changes the driving method of the two-dimensional detection unit 205 based on the signal indicating the radiation irradiation which is output from the detection unit 1001. As a result, the radiation imaging apparatus 203 can perform imaging without connecting to the radiation control apparatus 202.

Figure 2:
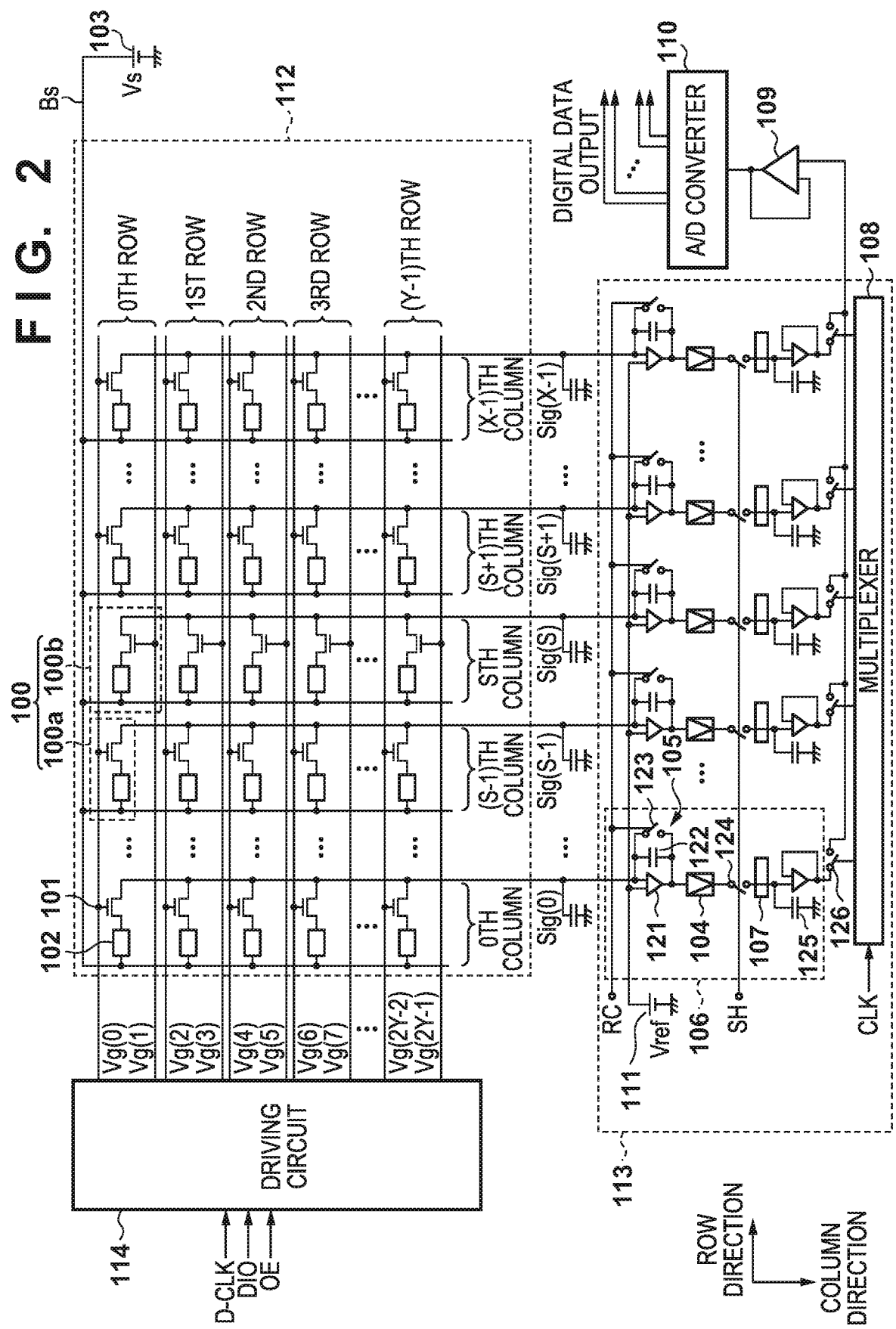
FIG. 2 is a circuit diagram of an imaging apparatus.

FIG. 2 is a circuit diagram showing an example of the arrangement of the two-dimensional detection unit 205. The two-dimensional detection unit 205 includes a driving circuit (shift register) 114, a pixel portion 112, a bias power supply unit 103, a readout circuit 113, an output buffer amplifier 109, and an analog/digital (A/D) converter 110.

The two-dimensional detection unit 205 is a sensor in which radiation detecting pixels 100 are arrayed in a two-dimensional matrix, and the two-dimensional detection unit outputs image information by detecting radiation. Although only some of the pixels 100 are shown in the pixel portion 112 of FIG. 2 for the sake of descriptive convenience, the actual two-dimensional detection unit 205 may have more pixels and may have 2800 rows×2800 columns of pixels in the case of a 17×17-inch two-dimensional detection unit. The pixel portion 112 includes rows in which a plurality of pixels, which are arranged in the rows, are divided into a plurality of groups. Groups belonging different rows include pixels which are reset at different timings. Here, for the sake of descriptive convenience, the pixels arranged in the rows are divided into two groups, and the pixels belonging to the two groups are called pixels 100a for imaging and pixels 100b for correction, respectively. The pixels 100a for imaging are arranged in a two-dimensional matrix to form an image to be used for diagnosis, and the pixels 100b for correction are arranged in a dispersed manner to correct the imaging and the pixel values of the respective pixels 100a for imaging by a method (to be described later). In this embodiment, assume that the pixels 100a for imaging and the pixels 100b for correction form a two-dimensional matrix of Y rows and X columns in the rows as shown in FIG. 2, and assume that each row includes at least one pixel 100b for correction. It will be assumed, for the sake of descriptive convenience, that, for each row, a pixel belonging to the Sth column will be the pixel 100b for correction and all pixels belonging to other columns will be the pixels 100a for imaging. However, other arrangements, such as changing the column in which the pixel 100b for correction is arranged for each row and the like, may be adopted. The pixels 100a for imaging and the pixels 100b for correction will be collectively called the pixels 100 hereinafter.

Each pixel 100 includes a conversion element 102 that converts radiation or light into charge and a switch element 101 that outputs an electrical signal corresponding to the charge of the conversion element. The conversion element 102 is an indirect or direct conversion element and converts the received radiation into charge. An indirect conversion element includes a wavelength converter that converts the radiation into light and a photoelectric conversion element that converts the light into charge. A direct conversion element directly converts the radiation into charge. As the photoelectric conversion element that converts the received light into charge, it is possible to use a MIS photodiode mainly made of amorphous silicon arranged on an insulated substrate such as a glass substrate or the like. The photoelectric conversion element may also be a PIN photodiode.

As each switch element 101, a transistor that includes a control terminal and two main terminals can be used. It is possible to use a thin-film transistor (TFT) for the switch element. One electrode of each conversion element 102 is electrically connected to one of the two main terminals of the switch element 101, and the other electrode is electrically connected to the bias power supply unit 103 via a common bias line Bs. The bias power supply unit 103 supplies a bias voltage Vs to the bias line Bs. The control terminals of the switch elements 101 of the pixels 100a for imaging and the pixel 100b for correction belonging to the 0th row are electrically connected to driving lines Vg(0) and Vg(1), respectively. In the same manner, the control terminals of the switch elements 101 of the pixels 100a for imaging and the pixel 100b for correction belonging to the kth row are electrically connected to lines Vg(2k) and Vg(2k+1), respectively. The driving lines Vg from the driving circuit 114 are arranged in correspondence with the groups of the respective rows. The driving circuit 114 can be formed from a shift register. The driving circuit 114 controls the conductive state of each switch element 101 by supplying a driving signal via the corresponding one of the driving lines Vg(0), Vg(1), . . . to the switch element 101. In the same manner, one main terminal of each switch element 101 of the pixel 100a for imaging or the pixel 100b for correction belonging to a kth column (k=0 to X−1) is connected to the conversion element 102 and the other main terminal is electrically connected to a corresponding one of signal lines Sig(k). When the switch elements are in the conductive state, electrical signals corresponding to the charge of the respective conversion elements are output to the readout circuit 113 via the signal lines Sig(k). The signal lines Sig(k) output the electrical signals which have been output from a plurality of pixels to the readout circuit 113.

In the readout circuit 113, an amplification circuit 106 that amplifies each electrical signal from a corresponding signal line is arranged for each signal line Sig(k). Each amplification circuit 106 includes an integral amplifier 105, a variable gain amplifier 104, and a sample and hold circuit 107. The integral amplifier 105 amplifies the electrical signal from the signal line. The variable gain amplifier 104 amplifies, by a variable gain, the electrical signal from the integral amplifier 105. The sample and hold circuit 107 samples and holds the electrical signal amplified by the variable gain amplifier 104. The integral amplifier 105 includes an arithmetic amplifier 121 that amplifies the electrical signal from the signal line and outputs the amplified electrical signal, an integral capacitor 122, and a reset switch 123. The integral amplifier 105 can change the gain (amplification factor) by changing the value of the integral capacitor 122. In the arithmetic amplifier 121 of each column, the inverting input terminal is connected to the signal line, the non-inverting input terminal is connected to a reference power supply unit 111 of a reference voltage Vref, and the output terminal outputs the amplified electrical signal. The reference power supply unit 111 supplies the reference voltage Vref to the non-inverting input terminal of each arithmetic amplifier 121. The integral capacitor 122 is arranged between the inverting input terminal and the output terminal of the arithmetic amplifier 121. The sample and hold circuit 107 includes a sampling switch 124 and a sampling capacitor 125. The readout circuit 113 also includes switches 126 of the respective columns and a multiplexer 108. The multiplexer 108 sequentially sets the switches 126 of the respective columns to the conductive state to sequentially output the electrical signals, which are output in parallel from the respective amplification circuits 106, as serial signals to the output buffer amplifier 109. The output buffer amplifier 109 impedance-converts each electrical signal and outputs the converted signal. The analog/digital (A/D) converter 110 converts each analog electrical signal output from the output buffer amplifier 109 into a digital electrical signal and outputs the electrical signal as image information to the processing unit 206 shown in FIG. 1.

The driving circuit 114 outputs, in accordance with control signals D-CLK, OE, and DIO input from the driving control unit 204 of FIG. 1, a driving signal that has an on-stage voltage, which changes the switch element into a conductive state, and an off-stage voltage, which changes the switch element into a non-conductive state, to the driving lines Vg(0), Vg(1) . . . . This allows the driving circuit 114 to drive the pixel portion 112 by controlling the conductive state and the non-conductive state of the switch elements. The control signal D-CLK is a shift clock of the shift register which is to be used as the driving circuit 114. The control signal DIO is a transfer pulse of the shift register serving as the driving circuit 114. The control signal OE is an output enable signal of the shift register serving as the driving circuit 114. The driving circuit 114 sets the driving time and the scanning direction by the above-described signals. The driving control unit 204 outputs control signals RC, SH, and CLK to the readout circuit 113 to control the operations of the respective components of the readout circuit 113. The control signal RC is a signal for controlling the operation of the reset switch 123 of each integral amplifier 105. The control signal SH is a signal for controlling the sampling switch 124 of each sample and hold circuit 107. The control signal CLK is a clock signal for controlling the operation of the multiplexer 108.

Figure 3:
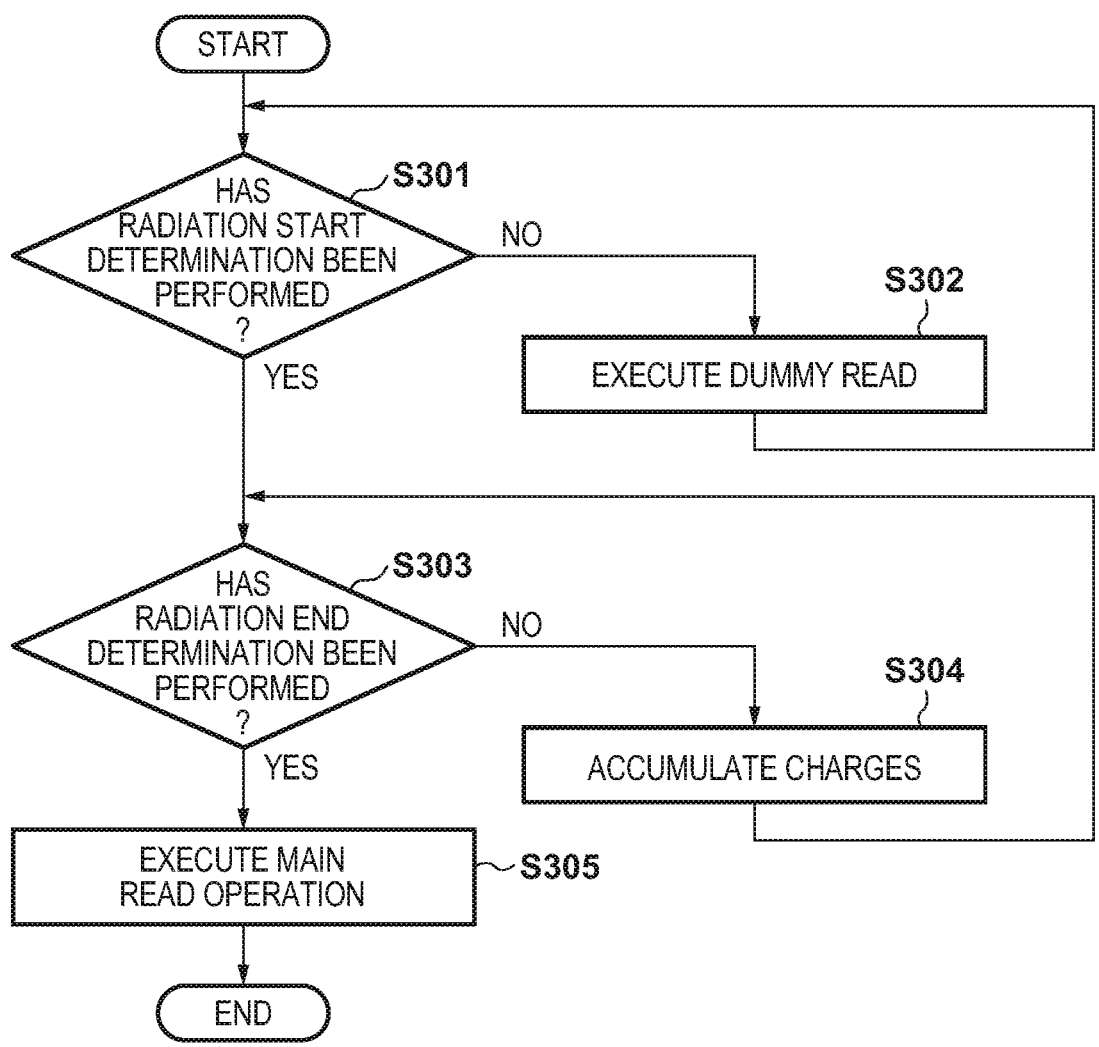
FIG. 3 is a flowchart illustrating a control method of a radiation imaging apparatus.

FIG. 3 is a flowchart illustrating a control method of the radiation imaging system shown in FIG. 1. FIG. 4 is the timing chart of this control method. In step S301, the driving control unit 204 determines whether radiation irradiation has been started. The radiation generation apparatus 201 performs radiation irradiation when a signal indicating the radiation irradiation operation is input from the radiation control apparatus 202. When a signal indicating the radiation irradiation is input from the detection unit 1001, the driving control unit 204 determines that the radiation irradiation has been started, and the process advances to step S303. On the other hand, if the signal indicating the radiation irradiation is not input from the detection unit, the driving control unit determines that the radiation irradiation has not been started, and the process advances to step S302.

In step S302, the pixel portion 112 performs, under the control of the driving control unit 204, an operation (to be referred to as a dummy read hereinafter) to reset the unnecessary accumulated charge in the conversion elements of the pixels 100. In the present invention, the pixels 100a for imaging and the pixels 100b for correction are reset at different timings in the following manner. As shown in FIG. 4, first, the driving line Vg(0) is set to the on-stage voltage for a predetermined period, and an operation to reset the unnecessary accumulated charge caused by a dark current is performed in the conversion element of each pixel 100a for imaging belonging to the 0th row. Subsequently, the process returns to step S301. Next, when the process advances to step S302, the driving line Vg(2) is set to the on-stage voltage for a predetermined period, and the reset operation of the conversion element of each pixel 100a for imaging belonging to the 1st row is performed, and the process returns to step S301. The dummy read of the pixels 100a for imaging from the initial 0th row to the final (Y−1)th row is completed by repeating these processes until a driving line Vg(2Y−2). In the subsequent step S302, the driving lines Vg(1), Vg(3), . . . , Vg(2Y−1) are sequentially set to the on-stage voltage for a predetermined period and the dummy read of the pixels 100b for correction from the initial 0th row to the final (Y−1)th row is completed. The dummy read of the pixels for imaging and the dummy read of the pixels for correction are repetitively performed until the start of radiation irradiation is determined.

When the start of radiation irradiation is determined in step S301, the dummy read is stopped, and the process advances to step S303. In this embodiment, it is assumed that the start of radiation irradiation is determined with a delay of a period T from actual start of the radiation irradiation as shown in FIG. 4, and during this period the dummy read operation is continued. Here, assume that driving lines Vg(2N−4), Vg(2N−2), and Vg(2N) are sequentially set to the on-stage voltage for a predetermined period during the period T. Some of the effective charge (which should be actually read as image data) accumulated in the conversion elements of the pixels 100a for imaging of the respective (N−2)th, (N−1)th, and Nth rows can leak to the corresponding signal lines Sig(k), and this can cause the image data, which is to be subsequently read out, to become partially deficient. On the other hand, since the dummy read of the pixel 100b for correction from the (N−2)th row to the Nth row is not performed, charge will not leak. The radiation imaging apparatus can determine the range of the rows or the pixel group that has been dummy read from the timing when the start of radiation irradiation has been determined until the start determination is made from the start of radiation irradiation. For example, since the radiation imaging apparatus can specify the pixel row or group whose reset operation has been stopped from the timing of the determination of the start of radiation irradiation, the range of the time or the predetermined row count or group that has been dummy read can be determined from the speed of the reset operation and the intensity pattern of the radiation. Alternatively, the radiation imaging apparatus may determine the correction range by determining whether there is a signal value deficiency from the difference between the signal values read out from the pixels for imaging and the signal values read out from the pixels for correction. In this case, a group with the deficiency may be determined by comparing the signal value difference with a threshold.

In step S303, the driving control unit 204 determines whether the radiation irradiation has ended. For example, the driving control unit 204 can determine the end of the radiation irradiation after a predetermined time (radiation irradiation period) has elapsed from the time of the determination of the start of the radiation irradiation. The driving control unit 204 may also determine that the radiation irradiation has ended when the input of the signal indicating the radiation irradiation from the detection unit 1001 has stopped. If the radiation irradiation has ended, the process advances to step S305. Otherwise, the process advances to step S304.

In step S304, the pixel portion 112 performs a charge accumulation operation under the control of the driving control unit 204. As shown in FIG. 4, all of the driving lines Vg(0) to Vg(2Y−1) are set to the off-stage voltage to change the switch elements of all of the pixels to the non-conductive state, and charge corresponding to the radiation irradiation are accumulated in the conversion elements. Subsequently, the process returns to step S303.

In step S305, the pixel portion 112 performs, under the control of the driving control unit 204, an operation (to be referred to as a main read hereinafter) to read out the pixel signals corresponding to the radiation irradiation. In the main read operation, the driving lines Vg(0), Vg(1), Vg(2), Vg(3), . . . are sequentially set to the on-stage voltage. As a result, electrical signals are output to the corresponding signal lines Sig(k) in the order of (pixels for imaging of the 0th row), (pixel for correction of the 0th row), (pixels for imaging of the 1st row), (pixel for correction of the first row) . . . . The A/D converter 110 outputs the pixel value of each pixel to the processing unit 206.

In a pre-correction two-dimensional image that has been read out as shown in FIG. 5A, since some of the effective charge of the (N−2)th to Nth rows has been lost in the pixels 100a for imaging other than the Sth column and the (N−2)th to Nth rows on which the pixels for correction are arranged, each pixel value z has accordingly decreased. The pixel value z has a high value since charge has not been lost in each pixel 100b for correction. FIG. 5B shows the row-direction plot of a pixel value z(x, N) of x column and Nth row before correction and that after the correction. In the present invention, the pixel value z(x, N) of an arbitrary position x can be corrected by referring (as a reference) to a pixel value z(S, N) of the pixel for correction arranged in the Sth column of the same row. As the simplest correction method, correction may be performed so that the average value of the pixel values of the pixels for imaging obtained after the correction, excluding the pixel value of the Sth column, for each row will match the pixel value z(S, N) of the pixel for correction obtained before the correction. That is, in the Nth row, the pixel value z(x, N) of the xth column and the average value <z(x, N)> of pixel values of all of the pixels (pixels for imaging) other than the pixel of the Sth column are used to obtain a pixel value z'(x, N) after the correction by $$z'(x,N)=z(x,N)\times\{z(S,N)/\langle z(x,N)\rangle\} \quad (1)$$

Pixel values of a predetermined number of columns before and after the Sth column on the Nth row may be used to obtain the average value. The pixel value of each pixel for imaging is corrected by the pixel value of the pixel for correction. The entire image can be formed based on the electrical signals from the pixels for imaging and the pixels for correction.

As another correction method, it is possible to perform correction to suppress the influence of various kinds of noise by using, instead of the pixel value z(S, N) of one pixel as the pixel for correction value, an average value obtained from averaging the pixel value z(S, N) and the pixel values of its neighboring pixels. For example, pixels for correction and pixels for imaging (whose charge has not been lost) from (N+1)th row and subsequent rows can be used as the neighboring pixels in this case. In addition, in a case in which pixels for correction are arranged in columns other than the Sth column (as will be described later), these pixels may be used as neighboring pixels to perform correction. In the correction of other rows (the (N−1)th row, and the like), the same correction as that performed for the above-described Nth row can be performed to correct each row.

Figure 6A:
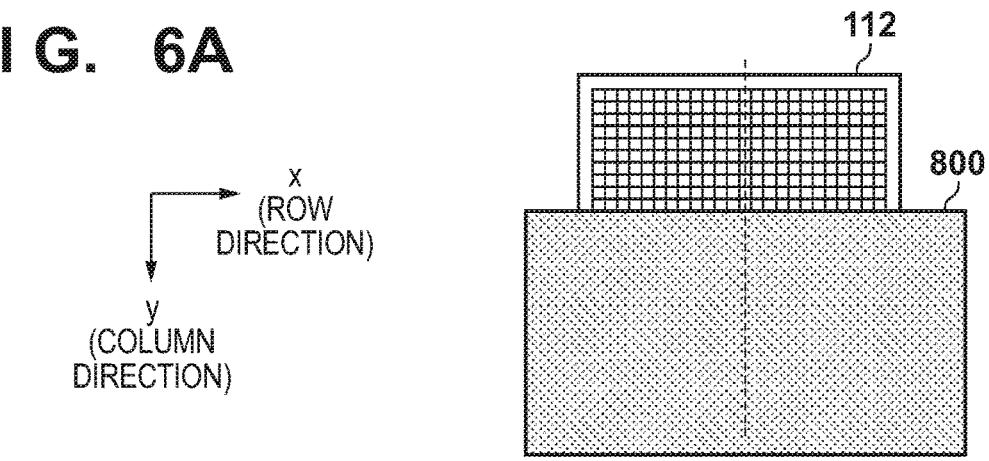
FIGS. 6A to 6D are pixel value profile views obtained when an object is arranged on a pixel portion.
Figure 6B:
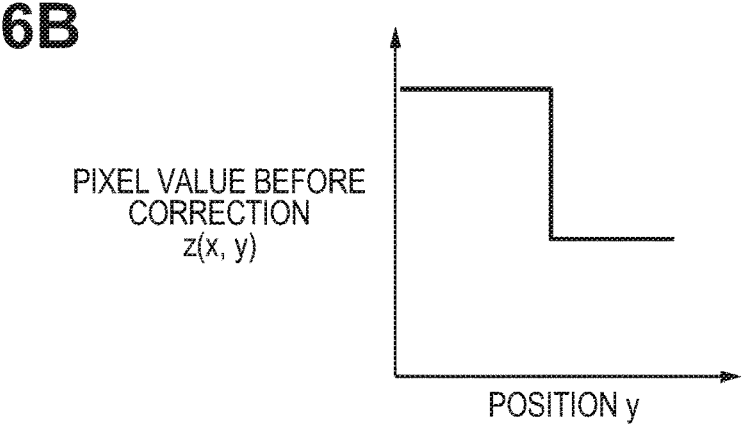
Figure 6C:
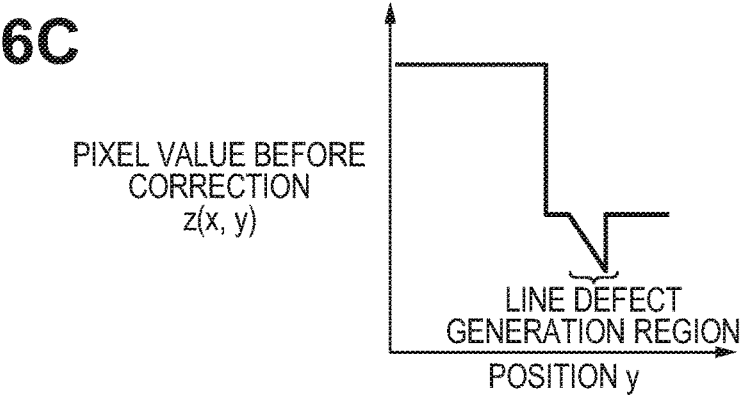
Figure 6D:
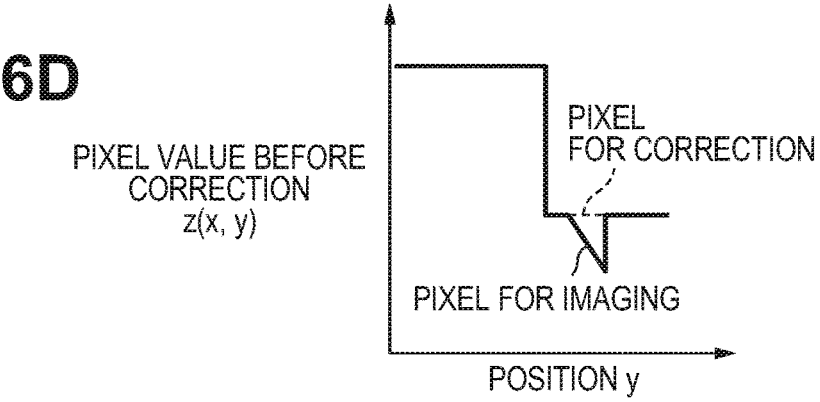

By executing line defect correction, it is possible to reduce artifacts. It is also possible to execute correction when a line defect is generated near a region where the profile of a pixel value changes in a column direction. Assume that an object 800 has been arranged on a pixel portion 112 as shown in FIG. 6A. The profile of a pixel value z(x, y) in the column direction, of a case without the generation of a line defect, changes greatly near the edge of the object in the manner shown in FIG. 6B. Now, as shown in FIG. 6C, assume that a band-shaped line defect has been generated when radiation irradiation is performed during a dummy read operation of the region near the above-described edge. When this is to be corrected, it may be difficult to discriminate the change in the actual pixel value profile by using the method of specifying the region where the line defect has been generated from the row direction profile of the pixel values. Depending on conditions such as the positional relationship between the edge of the object and the region where the line defect has been generated, the step amount of the profile, the data deficiency generation amount, and the like, it is difficult to discriminate between the state of the change in the actual pixel value profile and the state of the line defect generated by data deficiency. Even if both states could be discriminated, an error may occur in the calculation of each type of coefficient (such as the intercept and the gradient used to linearly approximate each pixel value near the line defect, and the like) which is to be used in the correction calculation for the line defect. Thus, there is a possibility that artifacts will be generated in the corrected image. On the other hand, according to the method of the present invention, since the pixel value of the pixel for correction is not influenced by data deficiency as indicated by the dotted line as shown in FIG. 6D, the line defect that was generated in the pixels for imaging can be corrected based on the pixel value of the pixel for correction. In addition, even in a case in which the above-described period T is very long and is in a state where data deficiency will be generated in the data of the pixel for correction, two types of profiles with different degrees of data deficiency can be obtained since the pixels for imaging and the pixels for correction are temporally apart from each other. It is possible to estimate the generation region and the generated amount of data deficiency by appropriately analyzing these profiles. In any of the cases, it is possible to appropriately correct the line defect and prevent artifacts from appearing in the corrected image. Note that the effect of the present invention is not limited to the state shown in FIG. 6A but also can be obtained, for example, in a case in which a grid is arranged in parallel to the row direction of the pixel portion 112. Furthermore, the correction can be executed by considering the offset value included in each pixel value.

Modification of First Embodiment

Figure 7A:
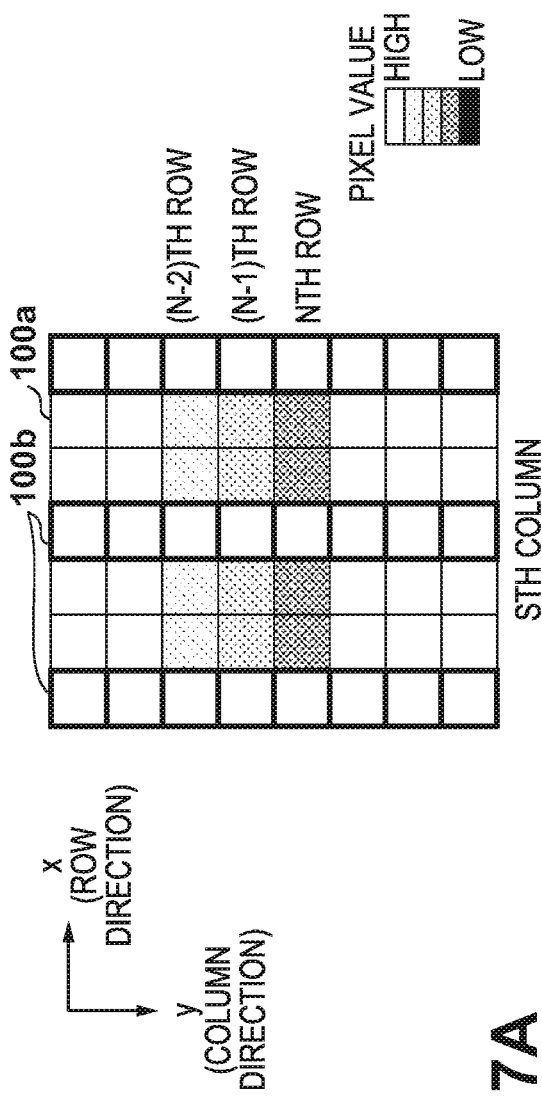
FIGS. 7A and 7B are a view showing a two-dimensional image representing pixel values before correction and a view showing pixel values before and after correction, respectively.
Figure 7B:
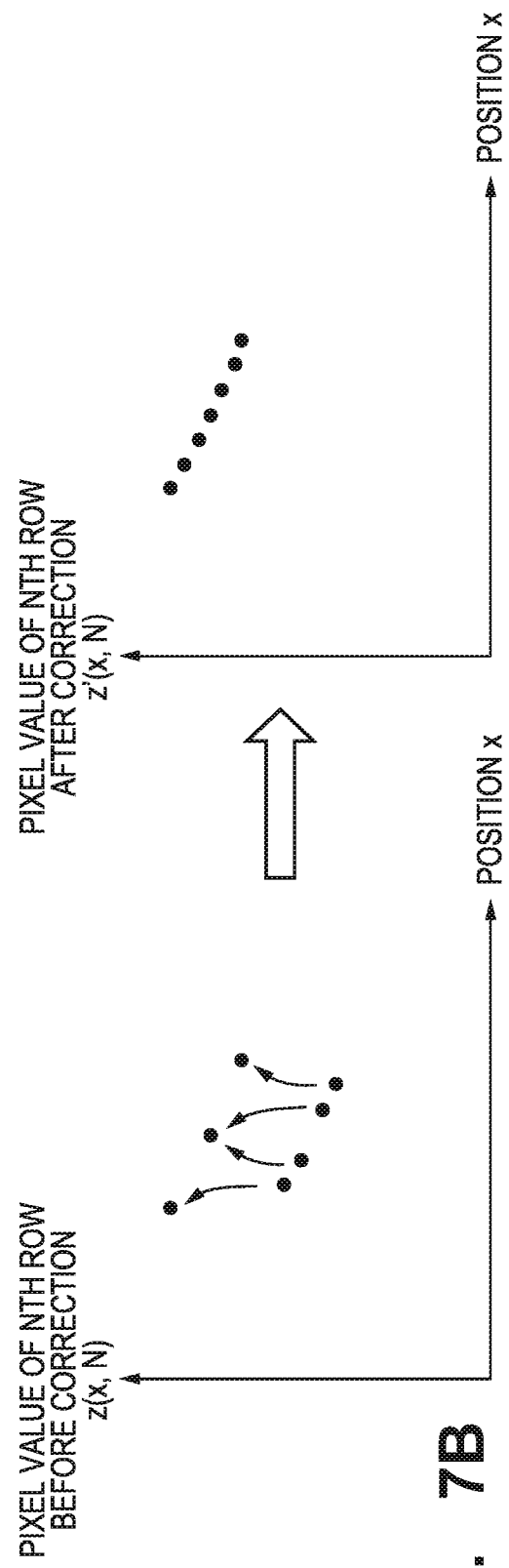

A plurality of pixels 100b for correction may be arranged in columns other than the Sth column in the manner shown in FIG. 7A. In this case, as shown in FIG. 7B, it is possible to perform correction by referring to a different pixel 100b for correction in accordance with the position of the correction target pixel 100a for imaging. By using the pixel value of a pixel for correction near the pixel for imaging with the deficiency for the correction, it is possible to accurately perform correction even in a case in which the pre-correction pixel values gradually change (are shaded) in the row-direction.

Figure 8:
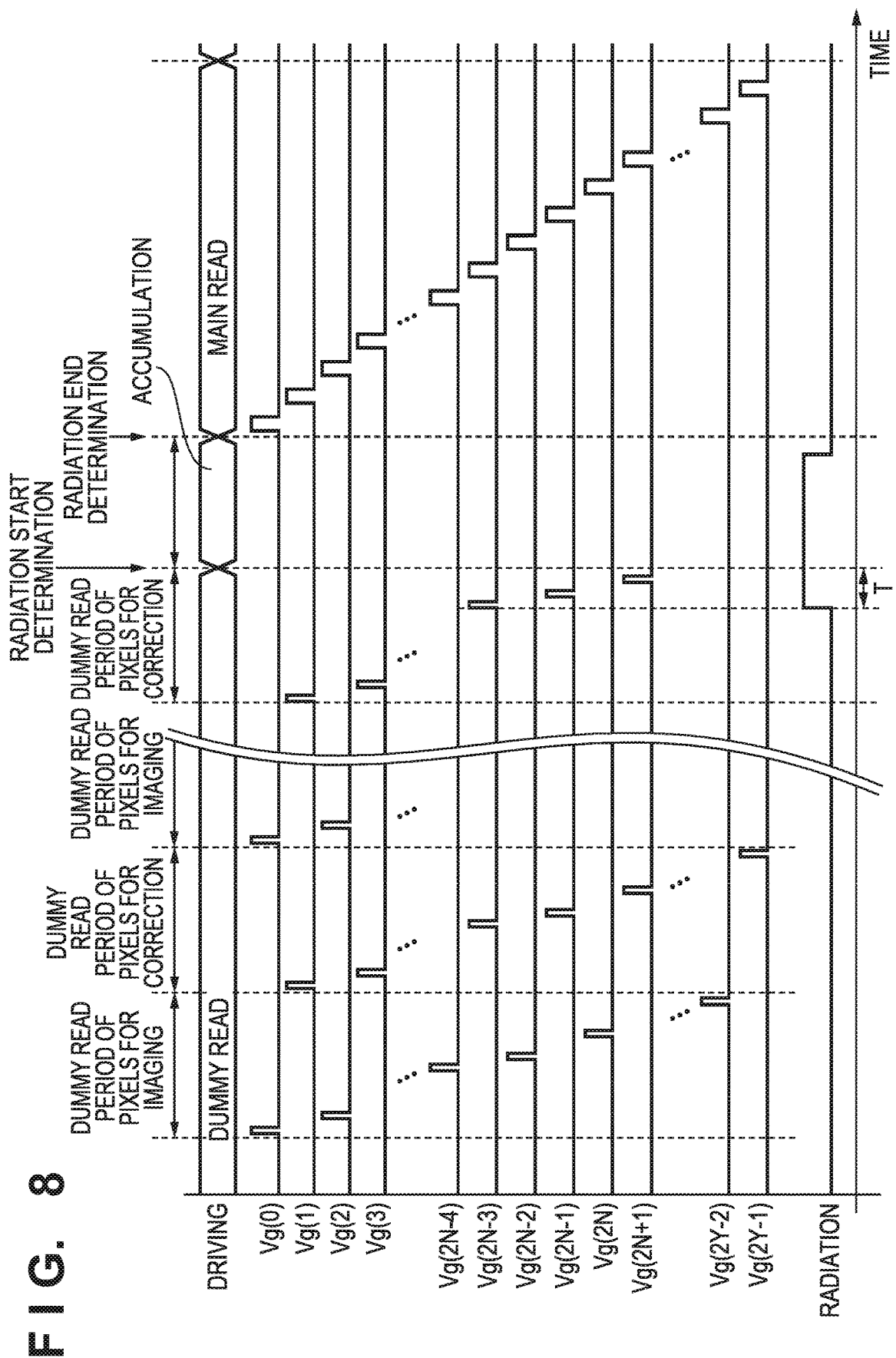
FIG. 8 is a timing chart showing the control method of the radiation imaging apparatus.
Figure 9A:
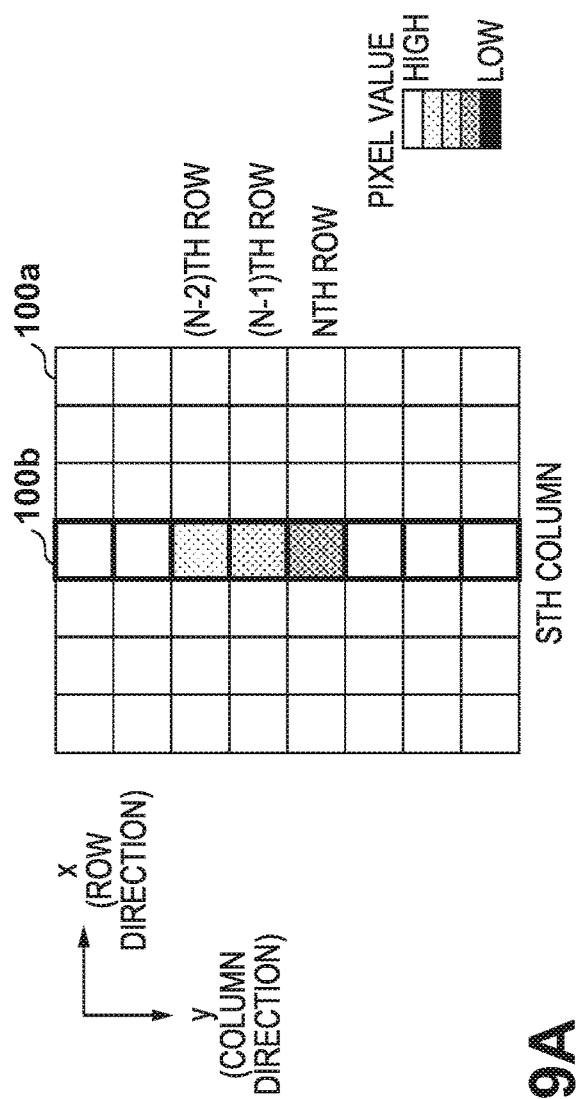
FIGS. 9A and 9B are a view showing a two-dimensional image representing pixel values before correction and a view showing pixel values before and after correction, respectively.
Figure 9B:
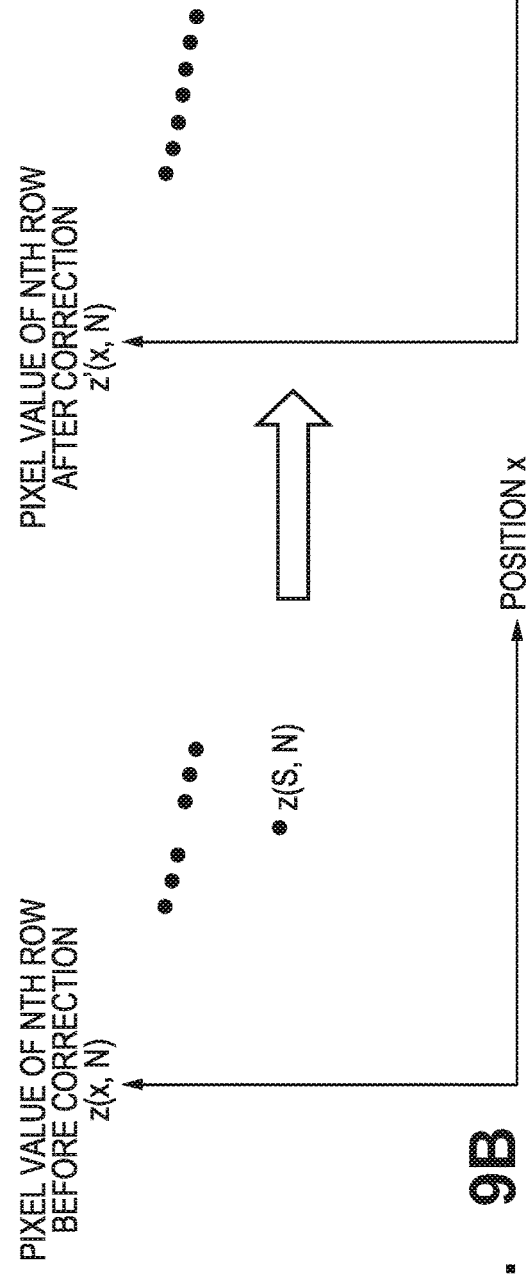
Figure 10:
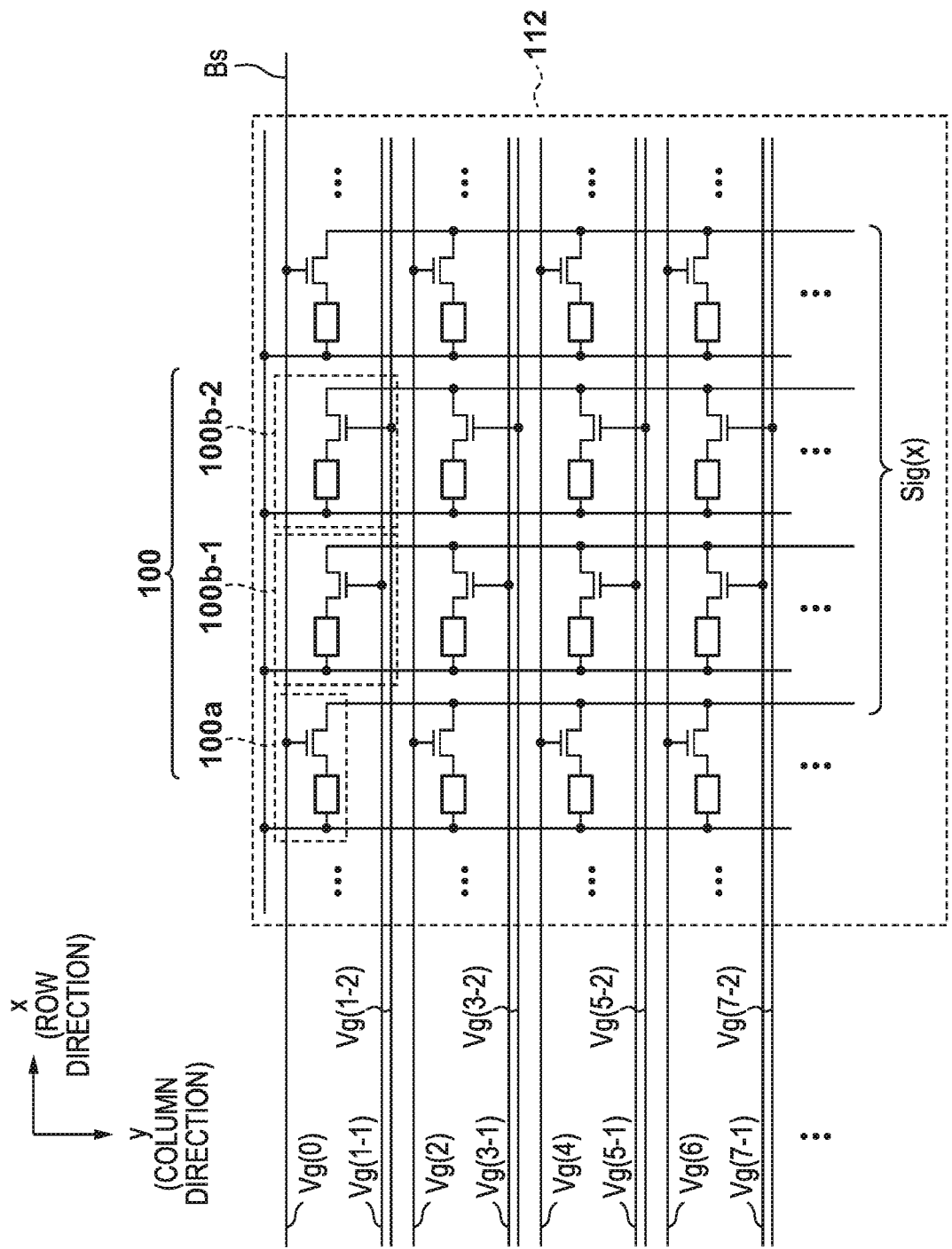
FIG. 10 is a circuit diagram of a part of the imaging apparatus.

Also, although it has been assumed in the above-description that some of the charge of the pixels for imaging is lost by the start of the radiation irradiation operation during the dummy read period of the pixels for imaging, depending on the irradiation timing, the radiation irradiation operation may be started during the dummy read period of the pixel for correction as shown in FIG. 8. In this case, the two-dimensional image of the pixel values that have been read out and the pixel value profile become as those shown in FIG. 9A. At this time, the role of the pixel 100b for correction and the pixel 100a for imaging can be switched so that by the pixel value of each pixel 100b for correction is corrected by referring to the pixel value of at least one or the pixel values of a plurality of pixels 100a for imaging. FIG. 9B shows the pixel value profile before the correction and that after the correction. In general, between the pixels for imaging and the pixel for correction, as long as the pixel value of each pixel whose charge has been lost by the dummy read is corrected by referring to the pixel value of a pixel whose charge has not been lost, it is possible to correct either the pixel for imaging or the pixel for correction which has lost charge. Thus, it is also effective to execute, before starting the series of correction processes, a comparison determination operation between the pixel value of each pixel for imaging and the pixel value of the pixel for correction and perform processing to switch the roles of the respective pixels as needed so as to use the pixel having a larger pixel value as the pixel for correction. Also, as another method, the plurality of pixels 100b for correction that have been arranged on the same row can be divided into a plurality of groups (for example, 2 groups, 100b-1 and 100b-2) beforehand as shown as in FIG. 10, and these groups may be connected to separate systems of driving lines (such as a system Vg(1-1) and a system Vg(1-2) or the like). This allows the dummy read period to be divided for each group. It may be controlled so that dummy read is executed in the order of the system of Vg(0), Vg(2) . . . , the system of Vg(1-1), Vg(1-3) . . . , and the system of Vg(1-2), Vg(3-2), . . . . In this example, the pixels belonging to one row are divided into three groups and a reset operation can be performed sequentially for each group.

Second Embodiment

Figure 11:
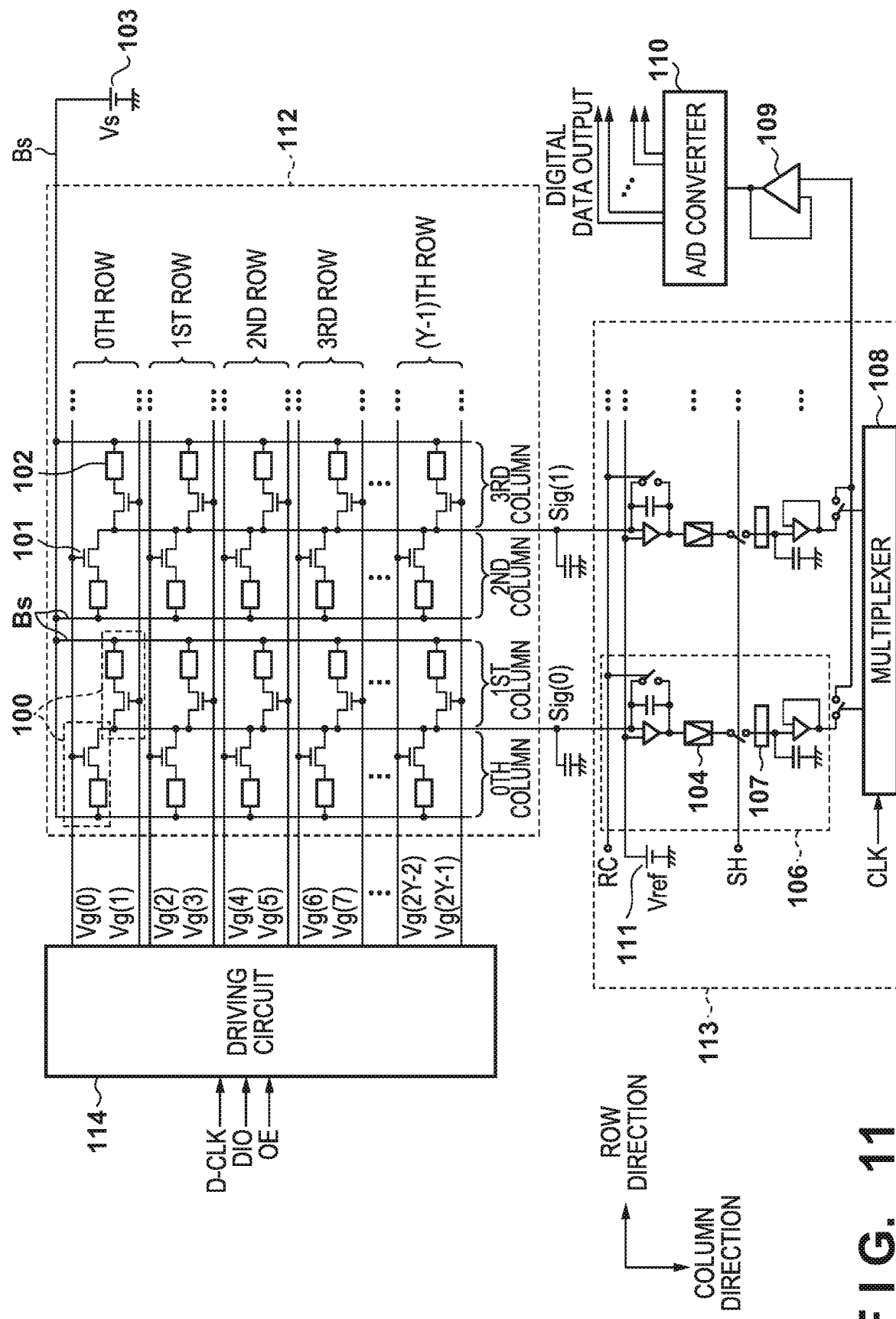
FIG. 11 is a circuit diagram of an imaging apparatus.

FIG. 11 is a circuit diagram showing another example of the arrangement of a two-dimensional detection unit 205. A pixel portion 112 includes pixels 100 which are arrayed in a two-dimensional matrix of Y rows and X columns. In the 0th row, the control terminals of the switch elements of the respective pixels belonging to even columns (0th, 2nd, 4th, . . . columns) are electrically connected to a driving line Vg(0) in common, and the control terminals of the switch elements of the respective pixels belonging to odd columns (1st, 3rd, 5th, . . . columns) are electrically connected to a driving line Vg(1) in common. Subsequently, in the same manner, in the kth row, the control terminals of the switch elements of the respective pixels belonging to the even columns and those belonging to the odd columns are electrically connected to driving lines Vg(2k) and Vg(2k+1), respectively, in common. In addition, this embodiment has an arrangement in which one signal line is shared between two adjacent pixels. That is, in each of the switch elements of the pixels belonging to the 2kth column and the (2k+1)th column (k=0, 1, 2, . . . ), respectively, one-side main terminals are connected to the conversion elements, respectively and the other-side main terminals are electrically connected to a signal line Sig(k) in common. Driving lines Vg, set so that two driving lines are arranged for each row, are connected to the control terminals of the switch elements of each group corresponding to the driving line so that the switch elements of the even column group or the switch elements of the odd column group will be driven in each row. When the driving line Vg(2k) and the driving line Vg(2k+1) are set to an on-stage voltage and an off-stage voltage, respectively, under the control of a driving circuit 114, signals accumulated in the pixels of even columns are output to the corresponding signal line. When the driving line Vg(2k) and the driving line Vg(2k+1) are set to the off-stage voltage and the on-stage voltage, respectively, signals accumulated in the pixels of odd columns are output to the corresponding signal line. By setting the above-described arrangement, it is possible to halve the number of signal lines to X/2 lines, and the circuit scale of a readout circuit 113 can also be halved compared to that of the first embodiment.

Note that instead of an arrangement in which the signal line is shared between two adjacent pixels, the same number of signal lines (X lines) as the number of pixel columns (X columns) may be arranged in a similar manner to the first embodiment. Also, bias lines BS, which are separately arranged for the pixels of the even columns and for the pixels of the odd columns, may also be commonly arranged for the pixels of the even columns and for the pixels of the odd columns.

FIG. 12 is a timing chart of the control method of a radiation imaging system according to this embodiment. In a dummy read period, the even columns and the odd columns are dummy read alternately so that the pixels of the odd columns are read sequentially and subsequently the pixels of the even columns are read sequentially. In a case in which data deficiency occurs due to the execution of a radiation irradiation operation during the dummy read period of the pixels of the even columns, the pixels of the even columns are set as the pixels for imaging and the pixels of the odd columns are set as the pixels for correction. That is, the pixel values of the odd columns will be referred to correct the pixel values of the even columns. On the other hand, in a case in which data deficiency occurs due to the execution of a radiation irradiation operation during the dummy read period of the pixels of the odd columns, pixel value correction is performed by setting the pixels of the odd columns as the pixels for imaging and the pixels of the even columns as the pixels for correction.

Figure 13A:
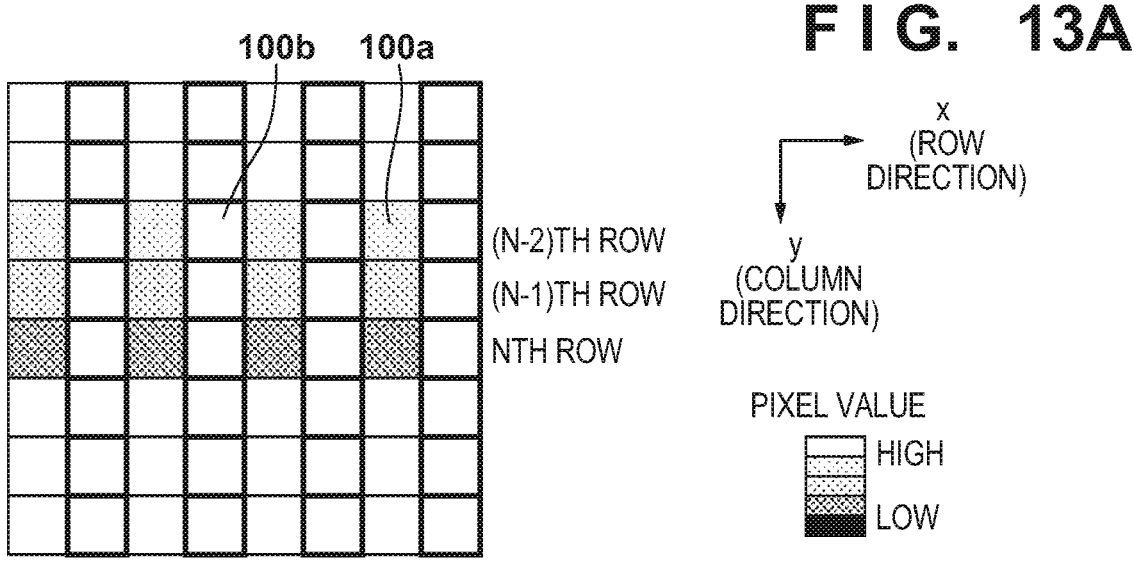
FIG. 13A is a view showing a two-dimensional image representing pixel values before correction.

FIG. 13A is a conceptual view of a two-dimensional image which is read out when data deficiency occurs in the pixels of the even columns. Assume that data deficiency has not occurred for the pixels of the odd columns because radiation irradiation has not been performed during the dummy read operation of the odd columns. The pixel values can be corrected by various kinds of methods for each row. Although a few examples of restoration methods of pixel values of the Nth row will be shown hereinafter, the pixel values of the (N−1)th row or the like can also be corrected by the same methods.

(A) A case in which a pair of pixel values are used.

Figure 13B:
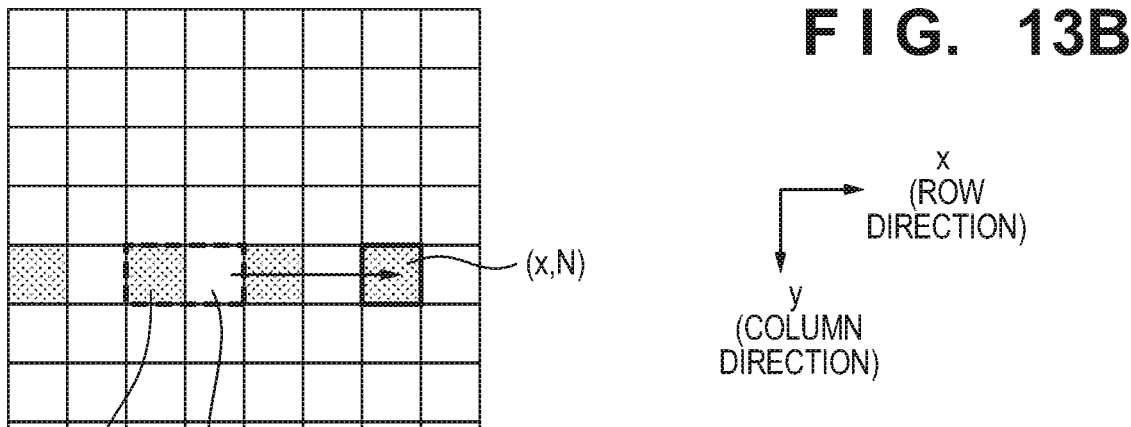
FIGS. 13B and 13C are views each showing a correction method.

As shown in FIG. 13B, correction is performed by using a pair of pixels formed by a pixel value z(k, N) of a kth column whose charge has been partially lost and a pixel value z(k+1, N) of a nearby (k+1)th column whose charge has not been lost. A corrected pixel value z'(x, N) of an arbitrary column x of the Nth row can be calculated based on the ratio between the pixel values by $$z'(x,N)=z(x,N) \times z(k+1,N)/z(k,N) \quad (2)$$

Note that offset correction may also be performed in consideration of the offset component included in each pixel value. In a case in which the magnitude of the offset component included in the pixel value z(x, N) is offset (x, N), a corrected pixel value z'(x, y) can be calculated by $$z'(x, N) = \quad (2')$$
$$\{z(x, N) - \text{offset}(x, N)\} \times \{z(k+1, N) - \text{offset}(k+1, N)\}/\{z(k, N) - \text{offset}(k, N)\} + \text{offset}(x, N)$$

Note that as the offset component obtainment method, for example, there is a method of obtaining a value that was generated in a state in which the switch elements were OFF and radiation irradiation was not performed during a period corresponding to the radiation irradiation period. Alternatively, a value generated in a state in which the switch elements were OFF and radiation irradiation was performed during the above-described period corresponding to the radiation irradiation period can be used. It is also possible to obtain the offset component by using a value generated in a state in which the switch elements were ON and radiation irradiation was not performed during the above-described period corresponding to the radiation irradiation period.

(B) A case in which a plurality of pixel values are used.

Figure 13C:
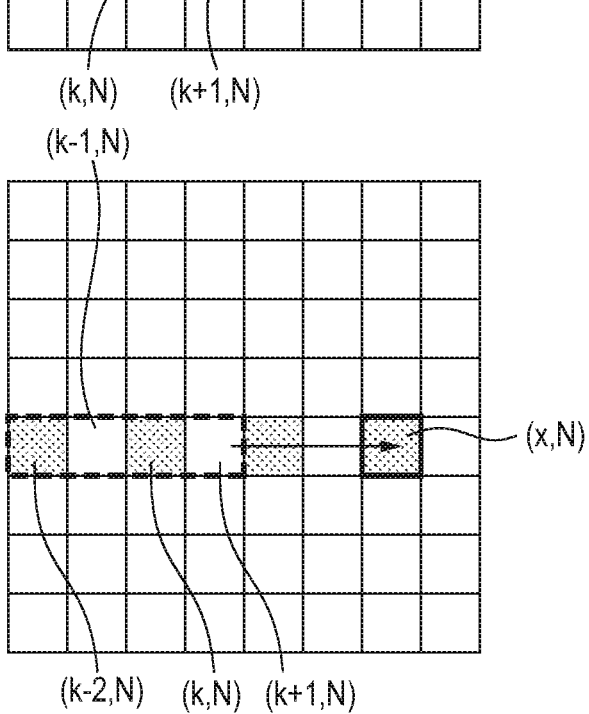

As shown in FIG. 13C, the pixel values of 4 pixels near the kth column (k is an even number) can be used to calculate the corrected pixel value z'(x, N) by $$z'(x, N) = \quad (3)$$
$$z(x, N) \times [\{z(k-1, N) + z(k+1, N)\}/2]/[\{z(k-2, N) + z(k, N)\}/2]$$

A further number of pixel values may be used. Using a plurality of pixel values suppresses noise influences and allows pixel value correction to be performed accurately even in a case in a pixel value has changed by receiving various kinds of noise influences during a two-dimensional image reading operation.

(C) A case in which the pixel for correction that is used as a reference is changed in accordance with the position of the pixel for imaging to be corrected.

Figure 14A:
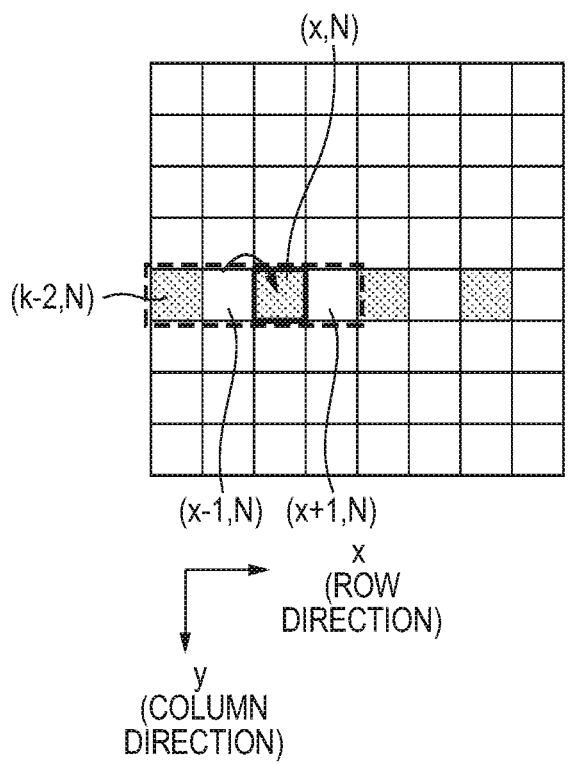
FIG. 14A is a view showing a two-dimensional image representing pixel values before correction.

As shown in FIG. 14A, the pixel values of 4 pixels near the xth column (x is an even number) can be used to calculate the corrected pixel value z'(x, N) by $$z'(x, N) = \quad (4)$$
$$z(x, N) \times [\{z(x-1, N) + z(x+1, N)\}/2]/[\{z(x-2, N) + z(x, N)\}/2]$$

Figure 14B:
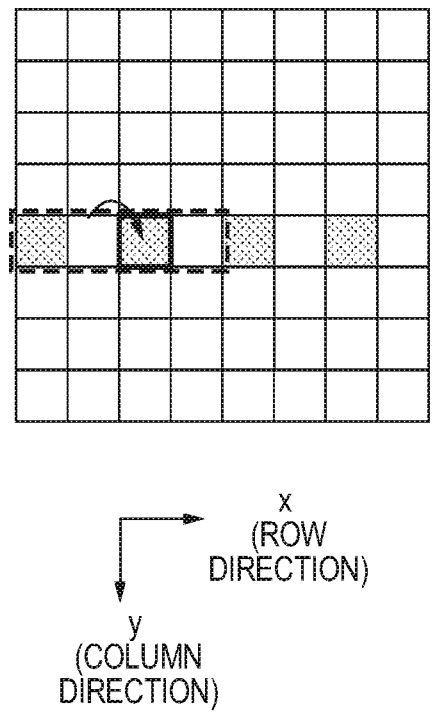
FIGS. 14B to 14D are views showing a correction method.
Figure 14C:
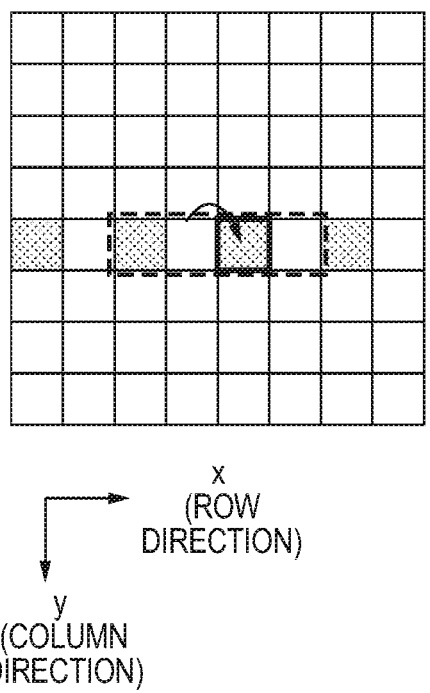
Figure 14D:
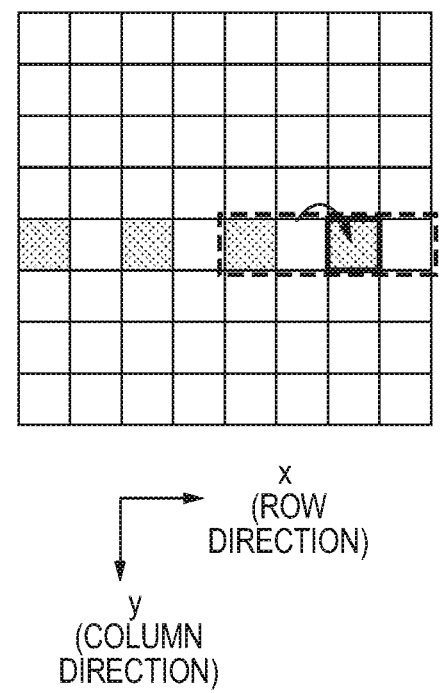

As shown in FIGS. 14B to 14D, by sequentially performing the correction of pixels belonging to an arbitrary column x by the above equation, each pixel value can be accurately corrected even in a case in which each pre-correction pixel value is changed (is shaded) in the row direction in the manner shown, for example, in FIG. 7A.

Modification of Second Embodiment (A) Example of Interlaced Driving

FIG. 15A is a timing chart of this modification of the circuit shown in FIG. 11. Only the driving lines Vg(0) to Vg(7) during the dummy read operation are shown. The dummy read periods are set as a repetition of dummy read periods 1 to 4, and the group of driving lines Vg(4$k$), the group of driving lines Vg(4$k$+1), the group of driving lines vg(4$k$+2), and the group of driving lines Vg(4$k$+3) are sequentially driven and reset in the dummy read periods 1 to 4, respectively. In the period 1, electrical signals are sequentially read out from pixels belonging to even columns of even rows. In the period 2, electrical signals are sequentially read out from pixels belonging to odd columns of the even rows. In the period 3, electrical signals are sequentially read out from pixels belonging to even columns of odd rows. In the period 4, electrical signals are sequentially read out from pixels belonging to odd columns of the odd rows. As a result, in the dummy read periods 1 to 4, electrical signals are sequentially read out from the pixels of the even columns of the even rows, the pixels of the odd columns of the even rows, the pixels of the even columns of the odd rows, and the pixels of the odd columns of the odd rows. The dummy read operation of pixels by interlaced driving is performed in this manner by alternately reading out the electrical signals from the pixels belonging to even rows and the electrical signals from the pixels belonging to odd rows.

FIG. 15B shows a conceptual view of a two-dimensional image obtained when data deficiency has occurred due to radiation irradiation in the period 3. In addition to alternately performing the dummy read operation of pixels on each even row and each odd row, the dummy read timing is changed for the even columns and the odd columns. This causes the dummy read operation to be performed on adjacently arranged pixels at discrete timings instead of continuous timings. As a result, when correcting a deficient pixel as a pixel 100a for imaging, it is possible to use not only the pixels horizontally adjacent to the deficient pixel but also column pixels which are vertically adjacent to the deficient pixel as pixels 100b for correction. Hence, correction can be performed with high accuracy even if various kinds of noise influences are received during the reading of a two-dimensional image.

(B) Example of Simultaneous Driving of a Plurality of Rows.

In the circuit shown in FIG. 11, a plurality of rows may be simultaneously reset in the dummy read period as shown in the timing chart of FIG. 16A. If the value of a current flowing in each bias line Bs is to be used to detect the radiation irradiation, the radiation detection sensitivity is improved because the bias current change of a plurality of rows can be detected. FIG. 16B shows a conceptual view of a two-dimensional image obtained when data deficiency has occurred due to radiation irradiation during the dummy read period of the pixels of even columns. The correction method of pixel values of the pixels for imaging can be the same as that in the first embodiment.

(C) Example in which the Driving of the Switch Elements is Changed at the Time of Interlaced Driving.

Figure 18:
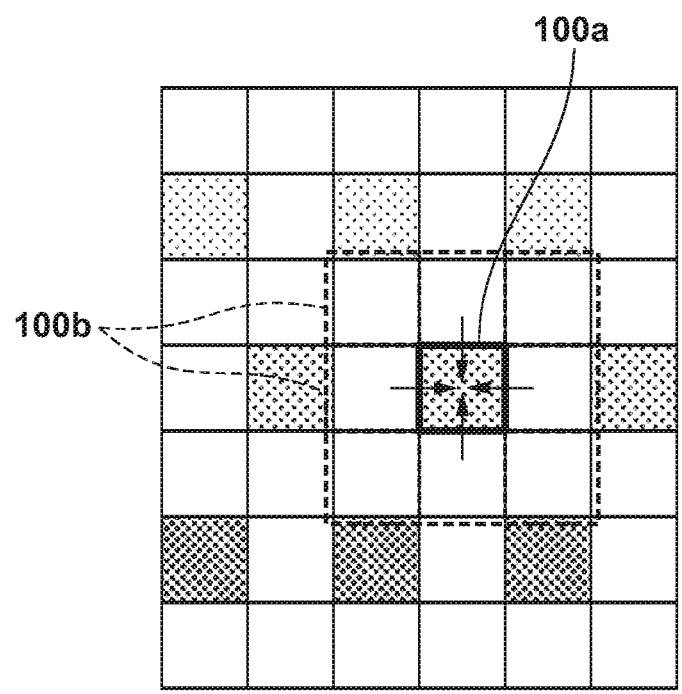
FIG. 18 is a view showing a correction method.

FIG. 17 is a circuit diagram showing another example of the arrangement of the two-dimensional detection unit 205. In the same manner as FIG. 11, in the 0th row and the 1st row, the control terminals of the switch elements of the respective pixels belonging to the even columns are connected to the driving line Vg(2k) in common, and the control terminals of the switch elements of the respective pixels belonging to the odd columns are connected to the driving line Vg(2k+1) in common (k is an integer). On the other hand, in contrast to FIG. 11, in the 2nd row and the 3rd row, the control terminals of the switch elements of the respective pixels belonging to the even columns are connected to the driving line Vg(2k+1) in common, and the control terminals of the switch elements of the respective pixels belonging to the odd columns are connected to the driving line Vg(2k) in common. Subsequently, the 4 rows of pixels are set as one cycle, and pixels connected in the above-described manner are repetitively arranged until the final (Y−1)th row. In this modification, a driving operation is performed as that shown by the timing chart of FIG. 15A in the same manner as "(A) Example of interlaced driving". The driving timing of pixels arranged around a predetermined pixel is executed at discrete timings instead of continuous timings. FIG. 18 shows a conceptual view of a two-dimensional image when data deficiency has occurred due to radiation irradiation in the dummy read period 3. When correction is to be performed by setting the deficient pixel as the pixel 100a for imaging, it is possible to use not only the pixels arranged horizontally adjacent to and the pixels arranged vertically adjacent to the deficient pixel, but more pixels as the pixels 100b for correction. This will allow correction to be performed with higher accuracy. In cases other than the above-described example, the reset timing of pixels of each column and each row can be controlled so that the arrangement of pixels to be reset will be discrete. As a result, a larger number of pixels can be used for correction.

Other Embodiments

Figure 19:
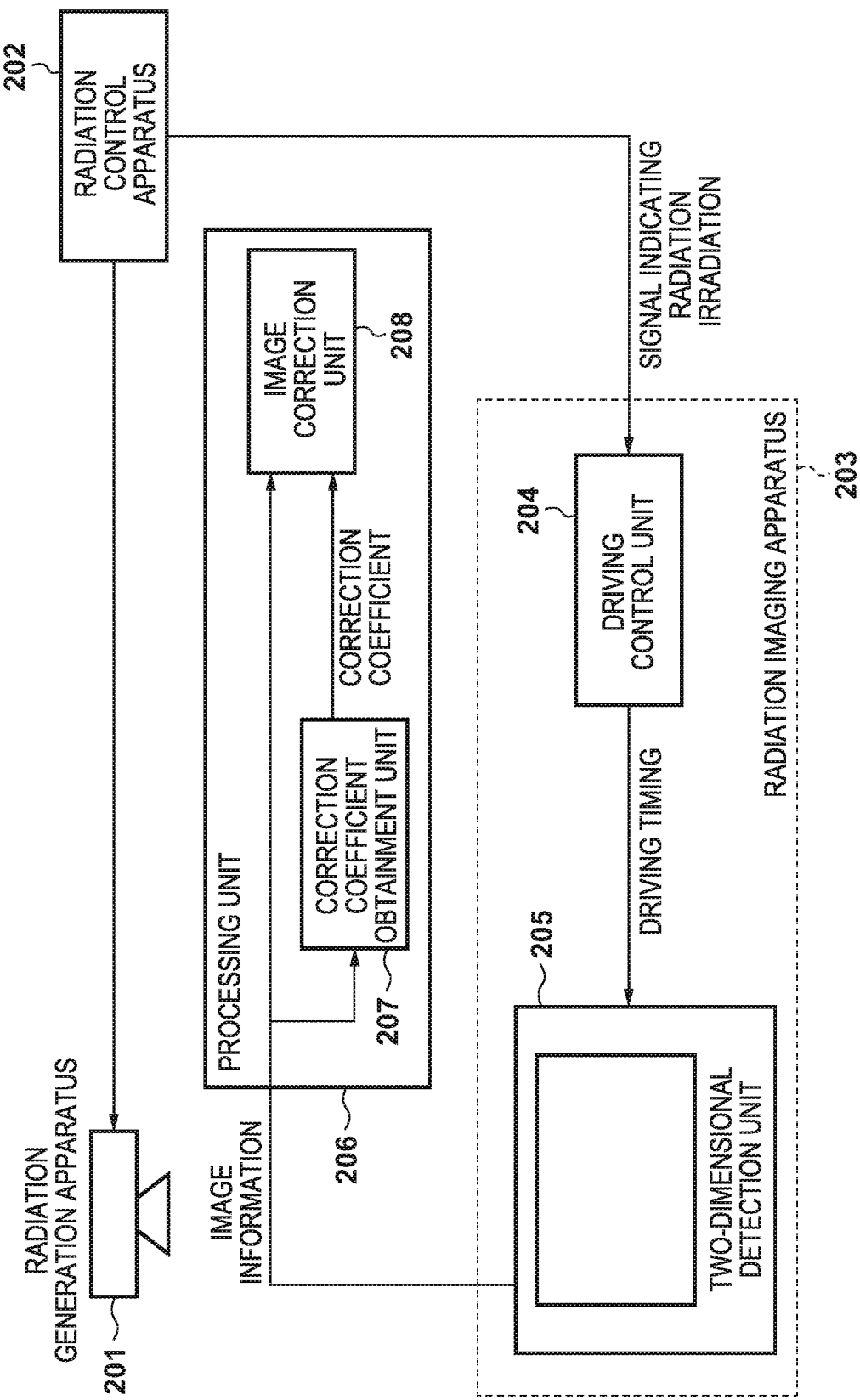
FIG. 19 is a block diagram showing of the arrangement of a radiation imaging system.

FIG. 19 is a block diagram showing another example of the arrangement of a radiation imaging system to which the present invention can be applied. Differing from that shown in FIG. 1, the system does not include a detection unit 1001, and a driving control unit 204 included in a radiation imaging apparatus 203 is connected to a radiation control apparatus 202 via wired or wireless connection. In step S303 of FIG. 3, when a signal indicating the radiation irradiation is input from the radiation control apparatus 202, the driving control unit 204 determines that the radiation irradiation has been started. When the signal indicating the radiation irradiation is not input, the driving control unit determines that the radiation irradiation has not been started. In this example, the driving control unit 204 can use the signal indicating the radiation irradiation transmitted from the radiation control apparatus 202. In this case as well, depending on the various kinds of conditions (the communication speed between the apparatuses, the time required for the radiation start determination, and the like), it can take time from the start of radiation irradiation until the start of the radiation irradiation is detected by the radiation imaging apparatus. As a result, data deficiency may occur. Even in a system in which a signal indicating the X-ray irradiation is input from outside the imaging apparatus in this manner, controlling the timing at which a dummy read (reset operation) is performed in the manner described above is effective in line defect correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-217512, filed, Nov. 10, 2017, which is hereby incorporated by reference herein in its entirety.

What is claimed is:
1. A radiation imaging system comprising:
a pixel portion having a plurality of rows each having a plurality of pixels, each pixel including a conversion element configured to convert radiation into charge and to accumulate the charge and a switch element that connects the conversion element to a signal line;
a driving circuit configured to drive a plurality of driving lines which are respectively provided for the plurality of rows; and
a processing unit configured to process a signal from the pixel portion, wherein
a control terminal of the switch element of each of the plurality of pixels is connected to any one of the plurality of driving lines,
the driving circuit performs a reset operation, by driving the driving lines, in which the conversion elements of the plurality of pixels of each row are repetitively reset until radiation irradiation is detected, stops the reset operation upon detecting the radiation irradiation, causes the conversion elements to accumulate charge, and subsequently causes the conversion elements to output a signal corresponding to an amount of the accumulated charge, the plurality of pixels of each row are grouped into a plurality of groups, and the plurality of groups are reset at different timings in the reset operation, and the processing unit corrects, by using a signal of a pixel of another group, a signal of a pixel of a group with data deficiency caused by the reset operation.

2. The system according to claim 1, wherein the plurality of driving lines are arranged in correspondence with the plurality of groups, respectively.

3. The system according to claim 1, wherein the plurality of groups include a group formed from pixels belonging to an even column and a group formed from pixels belonging to an odd column.

4. The system according to claim 3, wherein in conversion elements of the pixels belonging to the odd column and the even column, which are arranged adjacently in each row, are connected to the signal line arranged in common for the pixels belonging to the odd column and the pixels belonging to the even column.

5. The system according to claim 1, wherein the reset operation includes a first period in which the reset operation is performed sequentially for each row for at least a first group of conversion elements, and a second period in which the reset operation is performed sequentially for each row for a second group of conversion elements different from the first group, and the first period and the second period are repeated.

6. The system according to claim 5, wherein the reset operation is performed for every other row.

7. The system according to claim 5 wherein the reset operation is performed sequentially for conversion elements of a predetermined group of a plurality of rows at the same timing.

8. The system according to claim 1, wherein a first driving line and a second driving line are arranged in parallel in a column direction for each row of the pixel portion, and in two continuous rows, the control terminal of the switch element of each of the pixels belonging to an even column is connected to the first driving line and the control terminal of the switch element of each of the pixels belonging to an odd column is connected to the second driving line, and in two continuous rows subsequent to the two continuous rows, the control terminal of the switch element of each of the pixels belonging to the even column is connected to the second driving line and the control terminal of the switch element of each of the pixels belonging to the odd column is connected to the first driving line.

9. The system according to claim 8, wherein in the reset operation, the driving circuit drives the first driving line in sequence for every other row and drives the second driving line in sequence for every other row, and repeats this.

10. The system according to claim 1, wherein the correction is performed based on a ratio of the magnitudes of the values of a signal of a group with a low average value and a signal of a group with a high average value.

11. The system according to claim 1, wherein the correction is performed based on a signal of a pixel belonging to another group of the same row as the pixel of the group with the deficiency.

12. The system according to claim 1, wherein the correction is performed based on a signal of a pixel belonging to another group which is adjacent to the pixel of the group with the deficiency.

13. The system according to claim 1, wherein the group with the deficiency is determined based on a timing at which the radiation irradiation is detected.

14. The system according to claim 1, wherein the plurality of pixels of each row are arranged in a line.

15. The system according to claim 14, wherein a pixel of one of the plurality of groups is arranged between pixels of another of the plurality of groups in the line.

16. A radiation imaging apparatus comprising:
a pixel portion having a plurality of rows each having a plurality of pixels, each pixel including a conversion element configured to convert radiation into charge and to accumulate the charge and a switch element that connects the conversion element to a signal line;
a driving circuit configured to drive a plurality of driving lines which are respectively provided for the plurality of rows; and
a processing unit configured to process a signal from the pixel portion, wherein
a control terminal of the switch element of each of the plurality of pixels is connected to any one of the plurality of driving lines,
the driving circuit performs a reset operation, by driving the driving lines, in which the conversion elements of the plurality of pixels of each row are repetitively reset until radiation irradiation is detected, stops the reset operation upon detecting the radiation irradiation, causes the conversion elements to accumulate charge, and subsequently causes the conversion elements to output a signal corresponding to an amount of the accumulated charge,
the plurality of pixels of each row are grouped into a plurality of groups, and the plurality of groups are reset at different timings in the reset operation, and
the processing unit corrects, by using a signal of a pixel of another group, a signal of a pixel of a group with data deficiency caused by the reset operation.

17. The apparatus according to claim 16, wherein the plurality of groups include a group formed from pixels belonging to an even column and a group formed from pixels belonging to an odd column.

18. The apparatus according to claim 17, wherein in conversion elements of the pixels belonging to the odd column and the even column, which are arranged adjacently in each row, are connected to the signal line arranged in common for the pixels belonging to the odd column and the pixels belonging to the even column.

19. The apparatus according to claim 16, wherein the reset operation includes a first period in which the reset operation is performed sequentially for each row for at least a first group of conversion elements, and a second period in which the reset operation is performed sequentially for each row for a second group of conversion elements different from the first group, and the first period and the second period are repeated.

20. The apparatus according to claim 19, wherein the reset operation is performed for every other row or sequentially for conversion elements of a predetermined group of a plurality of rows at the same timing.

* * * * *